US007583851B2

(12) United States Patent
Kudo et al.

(10) Patent No.: US 7,583,851 B2
(45) Date of Patent: Sep. 1, 2009

(54) APPARATUS AND METHOD FOR PROCESSING AN IMAGE

(75) Inventors: Toshio Kudo, Kawasaki (JP); Atsushi Yamada, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 518 days.

(21) Appl. No.: 11/086,585

(22) Filed: Mar. 23, 2005

(65) Prior Publication Data

US 2006/0140498 A1 Jun. 29, 2006

(30) Foreign Application Priority Data

Dec. 28, 2004 (JP) ............................. 2004-381070

(51) Int. Cl.
*G06K 9/40* (2006.01)
*G06K 9/36* (2006.01)
*G06K 9/54* (2006.01)
*G06K 9/60* (2006.01)
*G05B 11/01* (2006.01)

(52) U.S. Cl. ....................... 382/254; 382/276; 382/303; 382/304; 700/8

(58) Field of Classification Search ................ 382/254, 382/276
See application file for complete search history.

(56) References Cited

U.S. PATENT DOCUMENTS

| 4,658,430 | A | * | 4/1987 | Anderson et al. | 382/297 |
|---|---|---|---|---|---|
| 5,077,810 | A | * | 12/1991 | D'Luna | 382/323 |
| 5,359,694 | A | * | 10/1994 | Concordel | 358/445 |
| 5,523,788 | A | * | 6/1996 | Kannegundla et al. | 348/321 |
| 5,870,493 | A | * | 2/1999 | Vogl et al. | 382/195 |
| 5,892,851 | A | * | 4/1999 | Nguyen | 382/252 |
| 6,148,118 | A | * | 11/2000 | Murakami et al. | 382/284 |
| 6,212,303 | B1 | * | 4/2001 | Doran et al. | 358/426.16 |
| 6,388,711 | B1 | * | 5/2002 | Han et al. | 348/441 |
| 6,404,909 | B2 | * | 6/2002 | Turek et al. | 382/132 |
| 6,671,418 | B2 | * | 12/2003 | Rengakuji et al. | 382/264 |
| 6,944,358 | B2 | * | 9/2005 | Morimoto et al. | 382/304 |
| 7,164,489 | B2 | * | 1/2007 | Li et al. | 358/1.16 |
| 2005/0008230 | A1 | * | 1/2005 | Sasaki | 382/232 |

FOREIGN PATENT DOCUMENTS

JP     2002-252749     9/2002

* cited by examiner

*Primary Examiner*—Brian P Werner
*Assistant Examiner*—Jose M Torres
(74) *Attorney, Agent, or Firm*—Arent Fox LLP

(57) ABSTRACT

An image processing apparatus is provided for enhancing the image processing function without having to increase the circuit scale. The image processing apparatus includes an image divider, a pixel processor, and an image coupler. If the number of horizontal pixels on the width of an input image is larger than a size of a line buffer, the image divider equally divides the input image in the vertical direction so that the resulting divided area is smaller than the number of horizontal pixels on the width of the line buffer. Then, the image divider controls an input data transfer circuit so that the pixel data of the input image may be sequentially transferred to the line buffer for each of the equally divided areas. The image processor sequentially processes the pixel data of the input image temporarily stored in the line buffer and then sends out the output pixel data. The image coupler controls the output data transfer circuit so that the output pixel data sequentially outputted for one divided area may be coupled with the output pixel for another divided area, for generating the output image.

14 Claims, 18 Drawing Sheets

APPARATUS AND METHOD FOR PROCESSING AN IMAGE

CROSS-REFERENCE TO RELATED APPLICATIONS

This application is based upon and claims the benefits of priority from the prior Japanese Patent Application No. 2004-381070, filed on Dec. 28, 2004, the entire contents of which are incorporated herein by reference.

BACKGROUND OF THE INVENTION (1) Field of the Invention

The present invention relates to an apparatus and a method for processing an image, and more particularly to an image processing apparatus and method which are arranged to read an input image on a predetermined scale, process the image, and generate an output image.

(2) Description of the Related Art

For a multimedia processing system, in particular, a system oriented for handheld devices, a request is rising more and more for enhancing a camera capability, concretely, increasing the number of pixels of a still image and improving processing performance of a moving image. On the other hand, another request is also rising more and more for enhancing a function density per one chip. Since both of the requests are to be balanced, for ameliorating the camera capability, a circuit area cannot be increased without considering the enhancement of the function density for one chip.

In the image treatment of the conventional multimedia processing system, for performing image processing such as gamma correction, color space conversion, and pixel interpolation with respect to Bayer data sent from a CCD (Charge Coupled Device) or CMOS (Complementary Metal Oxide Semiconductor) sensor, the Bayer data is read in blocks or lines.

The description will be oriented to the image processing apparatus which is arranged to read data in blocks.

FIG. 15 illustrates the data reading sequence in the conventional block read. FIG. 16 is a block diagram showing the conventional processing circuit for reading the blocks. When reading the blocks, Bayer data 800 for one image is divided into blocks 801, each of which is made up of the predetermined number of pixels in the horizontal and the vertical directions, and is read in sequence block by block. In the illustration, the data is read in the sequence of block numbers, that is, in the sequence from the block 1 located in the upper left toward the right hand, that is, the block 1, the block 2, the block 3, . . . as shown in FIG. 15. In this data read, for processing an image in pixels, the data is read as securing a predetermined overlapped area.

In the block-by-block reading and processing circuit, the Bayer data is read block by block in the foregoing block sequence through a system bus 901a and then is temporarily stored in a block buffer 0 (902a) or a block buffer 1 (902b). A selector 903 serves to select data saved in one buffer and then output the selected data to a color processor 904 for processing an image. For enhancing the processing efficiency, the data is written in the other buffer that is not connected with the color processor 904 through the system bus 901a. The color processor 904 executes the image processing with the input pixel data and then outputs the processed data through the system bus 901b.

In turn, the description will be oriented to the image processing apparatus which is arranged to read data in lines. FIG. 17 illustrates the data reading sequence in the conventional process of reading data in lines. FIG. 18 is a block diagram showing the conventional line-by-line reading and processing circuit. In the line-by-line reading process, the Bayer data 800 is read in sequence on one horizontal line unit 810.

The line-by-line reading and processing circuit is arranged to read the Bayer data line by line in sequence from the top to the bottom and then to temporarily save the line data in a line buffer 905. The line buffer 905 has a capability of storing the required number of lines for image processing in the color processor 904. The color processor 904 executes the image processing with respect to the pixel data stored in the line buffer 905 and then outputs the processed data through the system bus 901b.

With respect to the line-by-line reading process, there has been proposed an image processing apparatus which is arranged to divide original image data that is more than the storage capacity (readable horizontal pixels) of the line memory into the data corresponding to the storage capacity of the line memory and the remaining data that is overflowed from the line memory. (For example, refer to Japanese Unexamined Patent Publication No. 2002-252749 (paragraph numbers [0021] to [0029] and FIG. 2).)

However, the conventional block-by-block or line-by-line reading process has difficulty in enhancing the function of the image processing without increasing the circuit scale. Concretely, the block-by-block reading process makes it possible to suppress a block size of an input buffer included in the color processor, thereby reducing the mounting area. As a disadvantage, however, this type of reading process increases the times of accessing a frame buffer in which an input image and an output image are stored and needs a longer processing time accordingly. Hence, as the pixels composing an image to be processed become more and more, the processing time is likely to be longer and longer. For example, a long time is taken in the process from when a shutter of a camera is depressed to when an image is processed to when the processed image data is stored in a storage medium. As another disadvantage, this reading process is not fitted for a moving image that requires fast processing.

Turning to the line-by-line reading process, this process involves so great a burst effect caused in reading or writing data in or from the frame buffer that it may shorten the processing time. However, this process needs to have some full-line-sized buffers as the input buffer of the color processor. This disadvantageously results in making the mounting area larger. Hence, as the pixels composing an image to be processed become more and more, the mounting area is made larger and larger. This larger mounting area becomes an obstacle to making the resulting product small and lightweight. In particular, this line-by-line reading process is not practically fitted for such a handheld device as a mobile phone or a digital camera that is likely to be smaller and more lightweight.

Further, in a case that the original image data that is larger than the storage capacity of the line memory is divided into the data area for the storage capacity of the line memory and the remaining data area overflowed from the storage capacity thereof when processing the original image data, the area for the line memory capacity is not matched in size to the overflowed area. This brings about a disadvantage of making switching of parameters such as a size complicated. Further, since the original image data is divided into those two areas when processing the image data, it is necessary to secure the storage capacity of the line memory for a half of an estimated line at minimum. As another disadvantage, this method does not cope with the image composed of a larger number of pixels.

SUMMARY OF THE INVENTION

The present invention is made in consideration of the foregoing respects, and it is an object of the present invention to provide an apparatus and a method for processing an image which are arranged to enhance the image processing function without having to increase a circuit scale.

In carrying out the object, according to an aspect of the present invention, an image processing apparatus is provided for reading an image on a predetermined unit basis, processing the image and generating the image to be outputted. The image processing apparatus includes a temporary storing unit having a storage area with a predetermined number of horizontal pixels on the width and for temporarily storing a plurality of lines of pixel data of the input image in the storage area composed of a predetermined number of horizontal pixels, an image dividing unit for equally dividing the input image in the vertical direction according to the predetermined number of horizontal pixels if the number of horizontal pixels of the input image is larger than the predetermined number of horizontal pixels of the temporary storing unit and controlling sequential transfer of the pixel data of the input image into the temporary storing unit at each divided area, an input data transfer unit for sequentially transferring the pixel data of the input image belonging to the divided area pointed by the image dividing unit to the temporary storing unit, a pixel processing unit for performing image processing on a single pixel or plural pixels basis with respect to the pixel data of the input image transferred to the temporary storing unit, an image coupling unit for controlling transfer of the output pixel data to be sequentially outputted from the pixel processing unit at each divided area, coupling the output pixel data of divided areas with each other, and generating the resulting image to be outputted, and an output data transfer unit for transferring the output pixel data to be outputted by the pixel processing unit to the pointed output image storage area.

According to another aspect of the present invention, an image processing method is provided for reading an input image on a predetermined unit basis, processing the image, and generating a final image to be outputted. In the image processing method, an image dividing unit equally divides the input image in the vertical direction according to the predetermined number of horizontal pixels on the width if the number of horizontal pixels on the width of the input image is larger than the predetermined number of horizontal pixels stored in a temporary storing unit having a storage area for the predetermined number of horizontal pixels on the width and for temporarily storing a plurality of lines of the pixel data of the input image in the storage area for the predetermined number of horizontal pixels on the width; the image dividing unit sequentially transfers the pixel data of the input image belonging to each of the divided areas to the temporary storing unit; a pixel processing unit performs image processing on a single pixel or plural pixels basis with respect to the pixel data of the input image transferred to the temporary storing unit; and an image coupling unit controls an output data transfer unit so that the output pixel data of the pixel processing unit outputted from the divided areas are coupled with each other. The image processing method is arranged to transfer the pixel data of the input image line by line on a unit basis of a number of horizontal pixels of each divided area, process the pixel data, and couple the output pixel data outputted from the divided areas with each other after the pixel processing is terminated for generating the final image to be outputted.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 8A, 8B, 8C, and 8D illustrate the operation of an address counter in the four-divisional process in the embodiment of the present invention, in which FIG. 8A shows the operation of the address counter in a first divided area, FIG. 8B shows the operation thereof in a second divided area, FIG. 8C shows the operation thereof in a third divided area, and FIG. 8D shows the operation thereof in a fourth divided area.

DESCRIPTION OF THE PREFERRED EMBODIMENTS

Hereafter, the embodiments of the present invention will be described with reference to the accompanying drawings. At first, the description will be oriented to the concept of the invention to be applied to the embodiments. Then, the concrete contents of these embodiments will be described.

Figure 1:
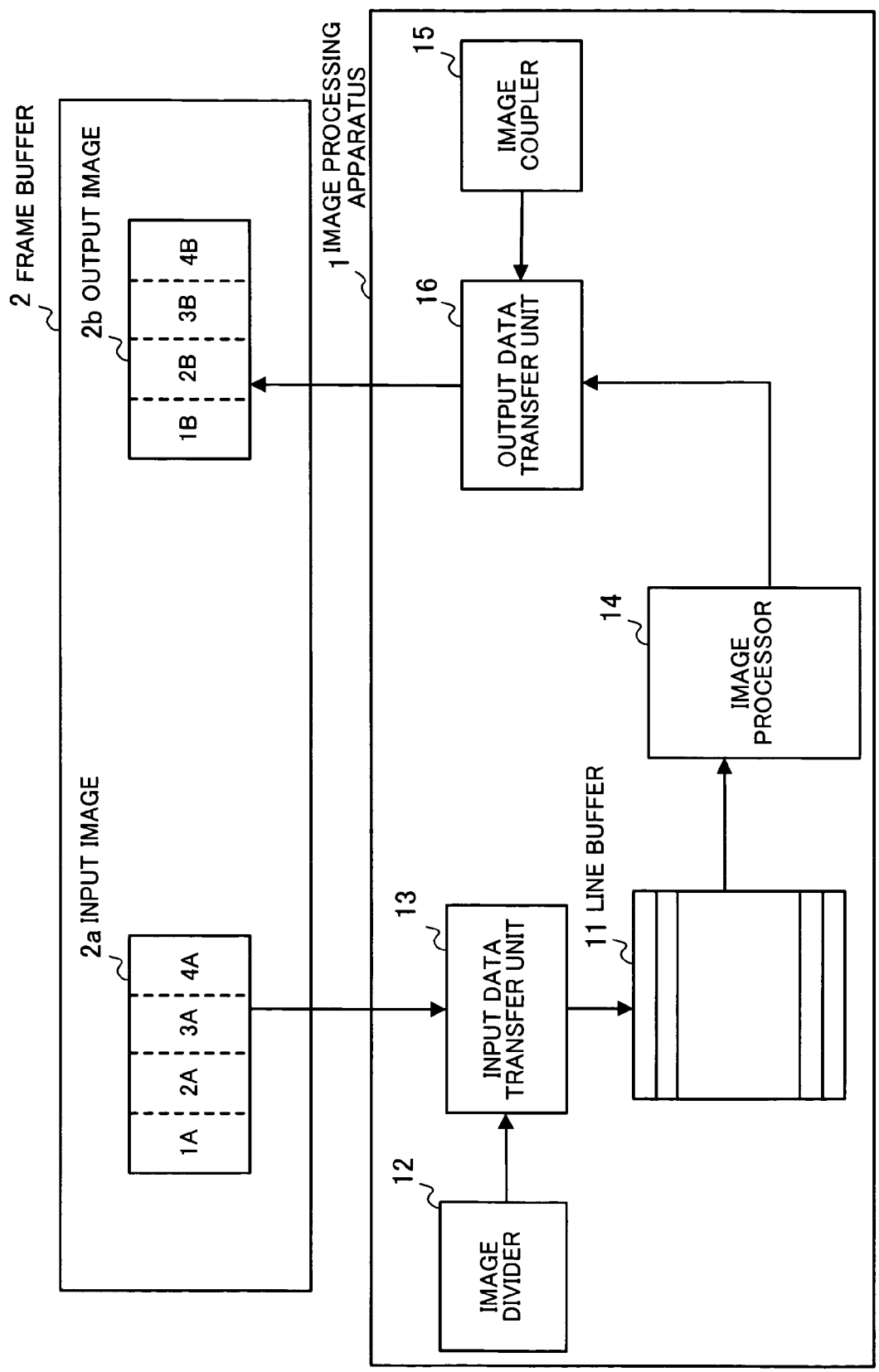
FIG. 1 is a concept view of the present invention to be applied to the embodiments.

FIG. 1 illustrates the concept of the invention to be applied to the embodiments.

An image processing apparatus 1 according to the invention has a function of inputting an input image 2a on a predetermined scale, processing the read input image, and writing the processed image as an output image 2b in a given area of a frame buffer 2. This image processing apparatus 1 is arranged to have a line buffer 11, an image divider 12, an input data transfer unit 13, a pixel processor 14, an image coupler 15, and an output data transfer unit 16.

The line buffer 11 is a temporary storage for temporarily storing pixel data to be processed in the image processing apparatus 1. The line buffer 11 has a capability of temporarily storing the pixel data of plural lines of the input image 2a on the width composed of the predetermined number of horizontal pixels. For example, since it is estimated that the processing size of a moving image is large enough to be a VGA size (consisting of 640×480 pixels) at maximum, the line buffer 11 has along the width a larger number of horizontal pixels than those of the VGA size at minimum and along the vertical the same number of vertical pixels as the unit pixels of the pixel processor 14 at minimum. For example, in the case of using the image processing filter of 5×5 pixels, five or six lines are provided.

The image divider 12 operates to vertically divide the input image 2a into the even number (referred to as 2N) of areas. That is, the image divider 12 compares the number of horizontal pixels of the input image 2a with the number of horizontal pixels of the line buffer 11 and equally divide the input image 2a in the vertical direction if the former is larger than the latter. In this division, the number of the equally divided areas is adjusted to be 2N. In the illustration, the input image 2a is divided into four areas of 1A, 2A, 3A and 4A. Then, by pointing to a read start point of each divided area and a read line width (over the number of horizontal pixels), the image divider 12 controls the input data transfer unit 13 so that the pixel data of the input image 2a may be sequentially transferred to the line buffer 11 in a divided area. In addition, the line size may be indicated by the number of divisions.

The input data transfer unit 13 transfers to the line buffer 11 the pixel data of the input image 2a line by line in the sequence of the line located at the read start point of the divided area pointed by the image divider 12. In addition, the input data transfer unit 13 may be realized by a data transfer program executed by a CPU or a DMA controller.

The pixel processor 14 executes the processing of using the image filter such as pixel interpolation and edge enhancement and further pixel-based operations such as gamma correction and color space conversion and then calculates the output pixel data. The image coupler 15 operates to couple the pixel data divided by the image divider 12 and then processed at each of the divided areas by the pixel processor 14. In the illustration, the image coupler 15 points a write start point and a line size to the output data transfer unit 16 conversely to the image divider 12 so that the pixel data of the divided area 1A of the input image 2a may be transferred to the corresponding divided area 1B of the output image 2b. The output data transfer unit 16 operates to transfer the pixel data to be outputted at each divided area by the pixel processor 14 into corresponding area of a storage area for the output image 2b under the control of the image coupler 15. In addition, the output data transfer unit 16 may be realized by a data transfer program executed by a CPU or a DMA controller.

In place of the input data transfer unit 13 and the output data transfer unit 16, two channels of DMAs may be provided for independently reading and writing data or one channel of DMA may be provided for exclusively reading or writing data.

In turn, the description will be oriented to the operation of the image processing apparatus 1 arranged as described above.

The image processing apparatus 1 includes a line buffer 11 for reading a line. The line buffer enables to temporarily store a plurality of lines at a predetermined number of horizontal pixels. If the number of horizontal pixels of the input image 2a to be stored in the frame buffer 2 is larger than the line size of the line buffer 11, the image divider 12 operates to vertically divide the input image 2a into 2N and partition the input image 2a into rectangular stripes each width of which is less than the line size. In the illustration of FIG. 1, the input image 2a is divided into four areas, that is, 1A, 2A, 3A and 4A divided areas. Then, the image divider 12 controls the input data transfer unit 13 so that the transfer unit 13 may transfer the pixel data of the input image 2a in a divided area.

For example, assuming that the data of the divided area 1A is transferred at first, the transfer of the data to the line buffer 11 is instructed with any pixel position (upper left) of the divided area 1A as the read start point and the read line unit as the number of horizontal pixels for the width of the divided area. The input data transfer unit 13 sequentially transfers to the line buffer 11 the data of the divided area 1A from the pointed read start point line by line with a number of horizontal pixels of the divided area as the reading unit. The pixel processor 14 processes the pixels temporarily stored in the line buffer 11 on a single pixel or plural pixels basis and then outputs the final pixel data. The image coupler 15 controls the output data transfer unit 16 according to the divided area for the output pixel image 2b so that the output data transfer unit 16 may transfer the output pixel data to the corresponding divided area. If the data is inputted from the divided area 1A, the image coupler 15 instructs the output data transfer unit 16 to transfer the output pixel data to the divided area 1B corresponding with the divided area 1A. These operations result in processing the pixel data of the divided area 1A of the input image 2a and specifying the divided area 1B of the output image 2b. In succession, the pixel data of the divided area 2A is processed. The image divider 12 operates to move the read start point by an offset value derived when obtaining the number of horizontal pixels on the width of the divided area and then perform the similar process to that about the divided area 1A. The image coupler 15 also operates to move the write start point by the offset value and then store the output pixel data in the divided area 2B. Later, the similar process is executed with respect to the other divided areas.

Figure 2:
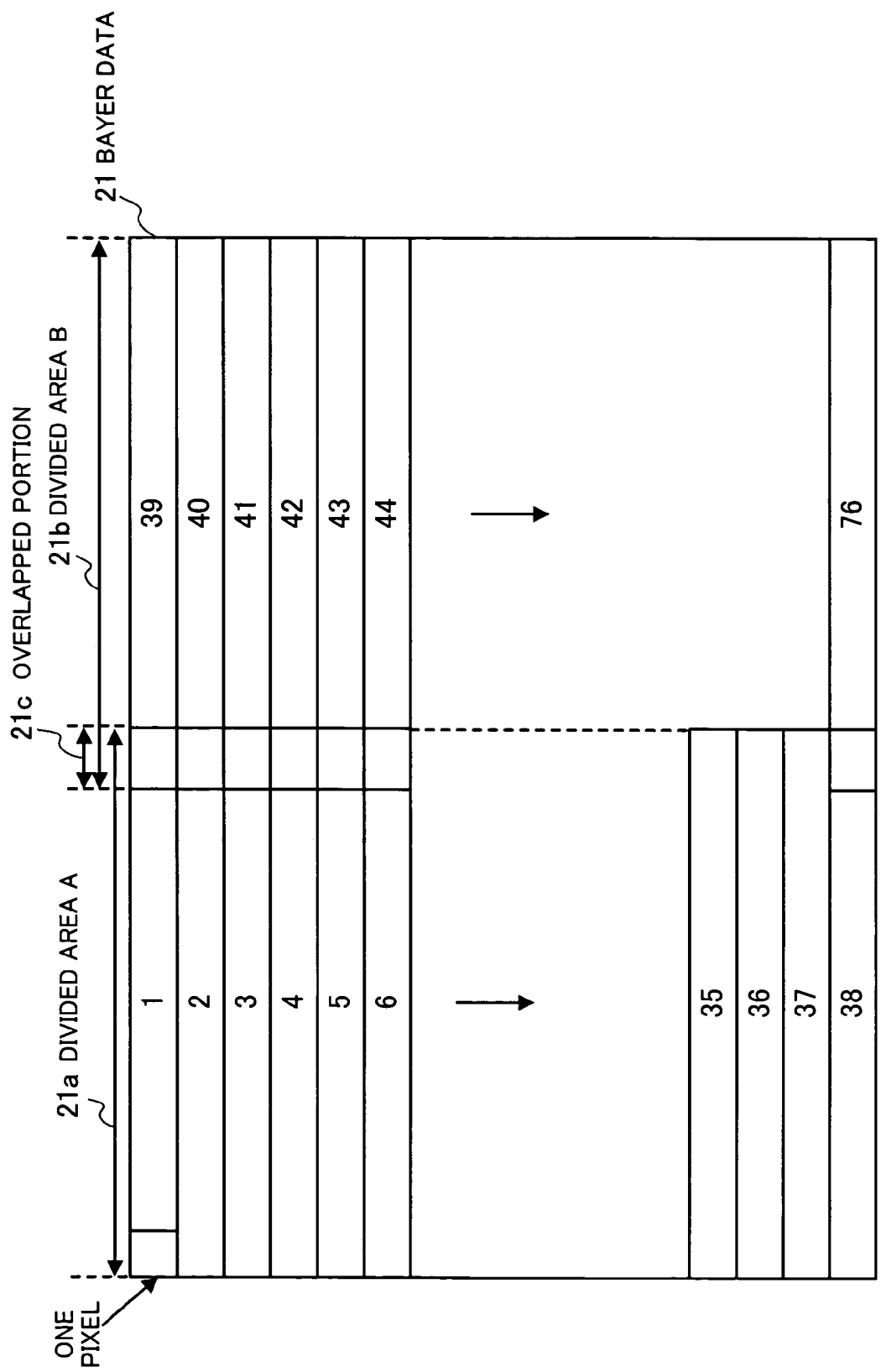
FIG. 2 illustrates a data transfer sequence in the case of dividing an image into two.

In turn, the data transfer sequence will be described. FIG. 2 illustrates the data transfer sequence in the case of dividing the image into two.

In the illustration shown in FIG. 2, the Bayer data 21 is transferred after it is divided into a divided area A (21a) and a divided area B (21b). In the image divider 12, if the number of horizontal pixels of the image to be divided is even, when dividing the data, the half of the horizontal pixel number plus "m" corresponds to the number of horizontal pixels in the width direction. Herein, "m" is a parameter depending on the image processing filter size. For a matrix of 5×5 pixels, m=2 is given. However, if the number of horizontal pixels of the image is odd, the horizontal pixel number cannot be divided into two. Hence, each divided area is specified to have the pixel data column located horizontally on the center and to have an addition of "+m". In the illustration, the division is executed so that the overlapped portion 21c may be included in both of the divided areas A (21a) and B (21b).

After the divided areas are determined, the data is transferred to the line buffer in the sequence of the divided areas A (21a) to B (21b). At first, the data transfer is started from the horizontal pixels on the width of the line 1 of the divided area A (21a) and then in the sequence of the lines 1 to 38. In succession, the data transfer is executed about the divided area B (21b) from the top (line 39 in FIG. 2). The pixel data on the last line (line 76 in FIG. 2) is transferred when the data transfer is terminated.

Further, the pixel processor 14 outputs the output pixel data of the divided areas A (21a) and B (21b) in the same sequence. The image coupler 15 controls the data transfer so that the output pixel data may be transferred to the corresponding locations of the output image, for coupling the images. In this data transfer, the divided area B (21b) causes the pixel data column horizontally located on the center, contained in both of the divided areas, to be overlapped with the divided area A (21a).

As described above, by providing a line buffer with a given line size and equally dividing the input image according to the line size in the vertical direction for processing the pixels, it is possible to process the image consisting of a larger number of pixels at a relatively fast speed as suppressing the capacity of the line buffer as much as possible. Since the input image is divided according to the line size of the line buffer, no upper limit is given to the number of pixels of the image to be processed. Further, since the moving image with a small number of pixels may be read in a full-line manner (in which all lines are read without being divided), the data processing is allowed to be realized at a high frame rate. As mentioned above, the function of the image processing is tried to be enhanced without having to increase the buffer capacity. In addition, the input image may be applied to the pixel data such as YUV in addition to the Bayer data.

Hereafter, the embodiment of the present invention will be described in detail with reference to the accompanying drawings. This embodiment is arranged so that the line size is equipped with a line buffer of 1024+α and the input image may be divided up to four. Further, the pixel processing on plural pixels basis is executed at the image processing filter of 5×5 pixels.

Herein, the line size of the line buffer located in the image processing apparatus needs to be as small as a bit more of a half of the number of horizontal pixels on the width of the input image because what is needed is just vertical division of the input image into two, processing of each rectangular image stripe, and returning those image stripes into one image. For example, the widely available image size may be a VGA (640×480 pixels) or an SVGA (Super Video Graphics Array (1024×768 pixels). In order to correspond with those sizes in a full-line manner at minimum, in this embodiment, the number of horizontal pixels on the width is assumed to be 1024+α (in which α denotes some margins).

If the size of the line buffer is 1024+α pixels, if a still image is divided up to four, the line buffer enables to cope with the image having 4096 pixels as the number of horizontal pixels. Further, since it is estimated that the size of the line buffer just needs to be large enough to cover the VGA size, the line buffer size of 1024+α makes it possible to process the pixel image at fast speed in the full-line manner.

Figure 3:
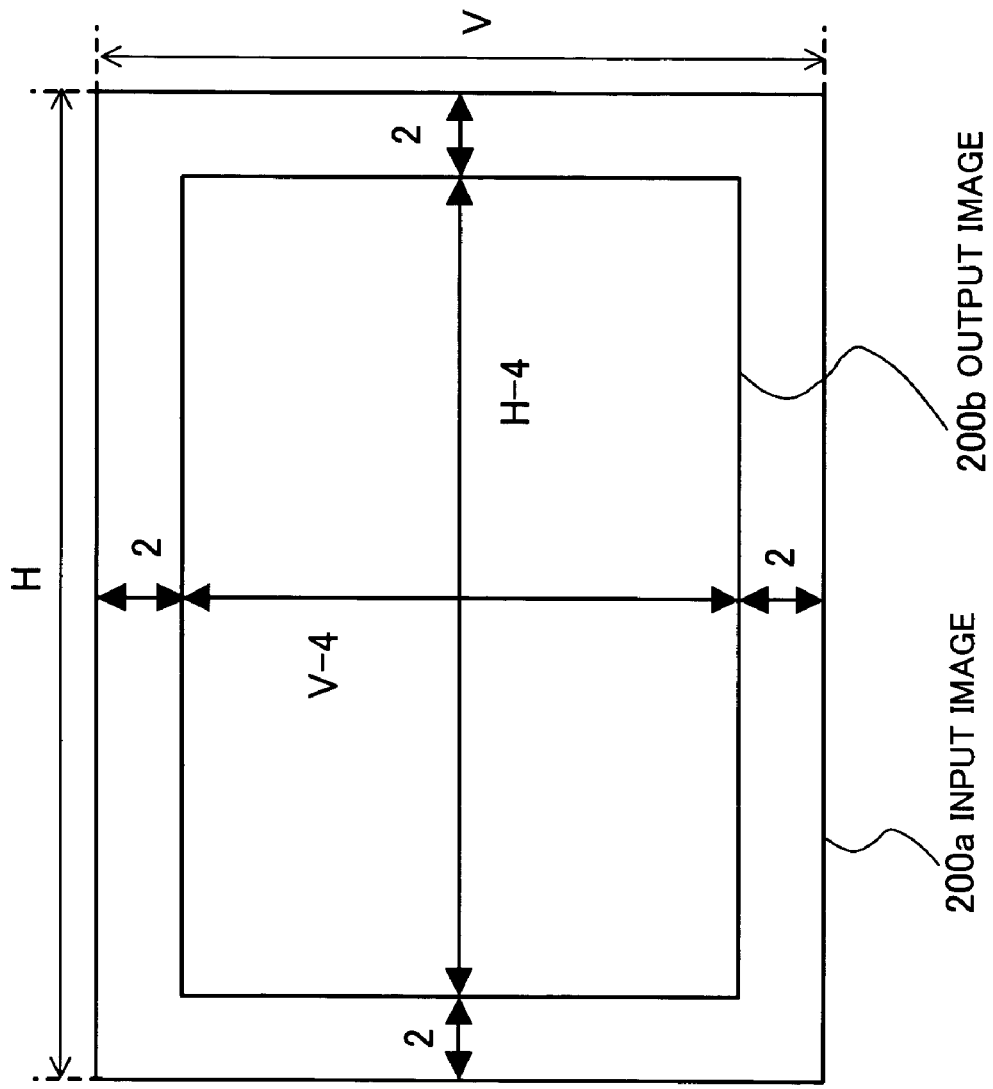
FIG. 3 illustrates a relation of size between an input image and an output image.

The image to be processed will be described. FIG. 3 shows the size relation between the input image and the output image. Since the image processing filter of 5×5 pixels is executed for processing the pixels, for the size of the input image 200a (H pixels in the horizontal direction and V pixels in the vertical direction), the size of the output image 200b is made smaller by two pixels in the vertical and the horizontal directions (H-4 pixels in the horizontal direction and V-4 pixels in the vertical direction). Hereafter, the number of horizontal pixels of the input image is H and the number of vertical pixels thereof is V.

Figure 4:
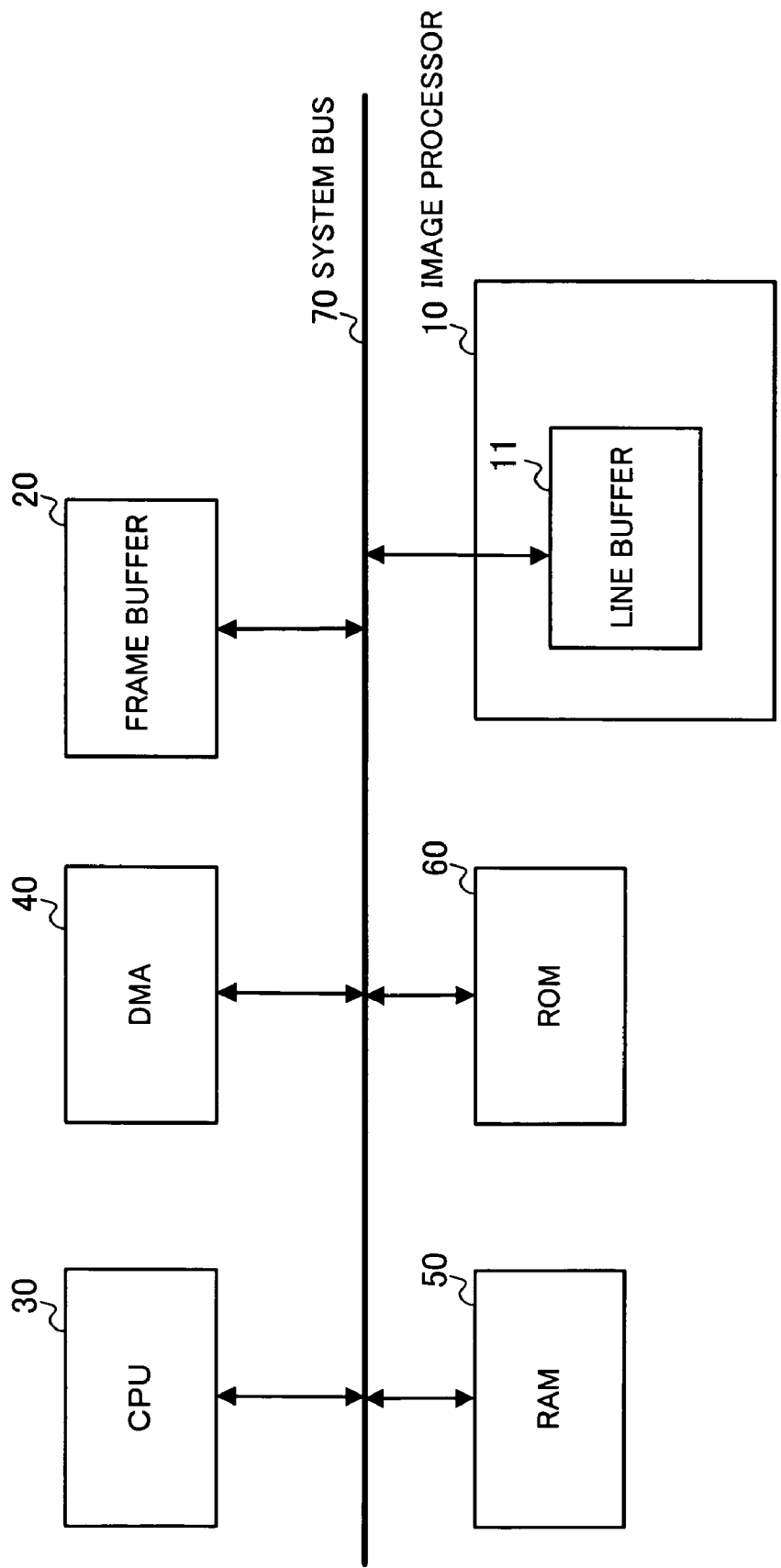
FIG. 4 is a block diagram showing an exemplary hardware arrangement of an image processing apparatus according to an embodiment of the present invention.

In turn, the description will be oriented to the hardware arrangement of the image processing apparatus with reference to FIG. 4.

The image processing apparatus is arranged to have an image processor 10, a frame buffer 20, a CPU (central processing unit) 30, a DMA 40, a RAM (random access memory) 50, and a ROM (read only memory) 60, all of which are connected through a system bus 70. The CPU 30 controls the overall apparatus.

The image processor 10 includes a line buffer 11 with a predetermined line size and operates to transfer the pixel data of an input image stored in the frame buffer 20 to the line buffer 11 on a predetermined line basis. After the pixels are processed, the image processor 10 transfers the data to the image storage area of the frame buffer 20. The pixel data of the input image to be processed and the pixel data of the processed output image are temporarily stored in the frame buffer 20. The CPU 30 controls the overall apparatus and functions the apparatus as the image divider, the image coupler and the image processor by executing a program. When a transfer destination, an address of a transfer source and a transfer size are specified, the DMA 40 transfers data without through the CPU 30. The RAM 50 stores various kinds of data required for the processing of the CPU 30. The ROM 60 stores the OS (Operating System) and relevant application programs.

The foregoing hardware arrangement makes it possible to realize the processing function of this embodiment. Since the foregoing arrangement is exemplary, the DMA 40 may take two channels through which data read and write are executed independently or one channel through which the data read or write is exclusively executed. Moreover, the CPU 30 may be in charge of the data transfer. The image divider for dividing the input image may take software arrangement composed of programs executed by the CPU 30 or hardware arrangement composed of an image divider. Likewise, the image coupler may be arranged by software or hardware.

Figure 5:
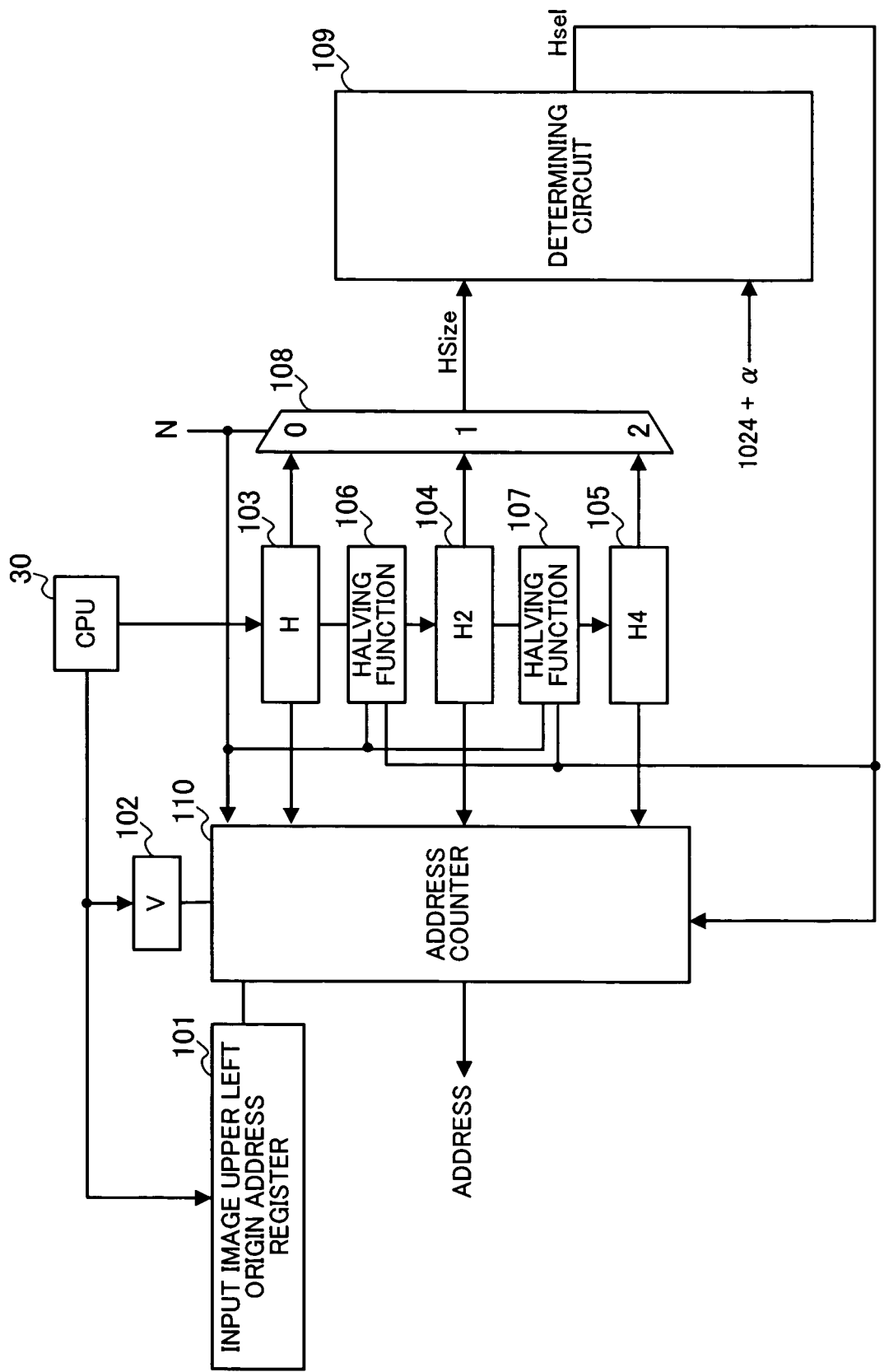
FIG. 5 is a block diagram showing a vertical 2N dividing circuit included in the embodiment.

In this embodiment, the image divider is arranged by hardware. FIG. 5 is a block diagram showing a vertical 2N divider according to this embodiment.

The vertical 2N divider is arranged to have an input image upper left origin address register 101, a vertical pixel number (V) register 102, a horizontal pixel number (H) register 103, a having horizontal pixel number (referred to as H2) register 104, a quartering horizontal pixel number (referred to as H4) register 105, halving functions 106 and 107 for halving an input value, a selector 108, a determining circuit 109 for determining the number of divided portions (referred to as the divisional number), and an address counter 110 for controlling data transfer.

The input image upper left origin address register 101, the V register 102 and the H register 103 are given their respective values specified according to the input image by the CPU 30. To the address register 101 is specified an upper left address to be the read origin point of an area where the input image is stored in the frame buffer. To the V register 102 is specified the number of vertical pixels of the input image. To the H register 103 is specified the number of horizontal pixels of the input image.

N denotes a counter for counting up a figure such as 0, 1, 2, ... and is stopped when the output Hse1 of the determining circuit 109 reaches 1 (in which the divisional number is determined).

The halving functions 106 and 107 are executed to calculate a value HSize derived by halving the number of inputted horizontal pixels when the count value of the counter N reaches the corresponding value and the output Hsel of the determining circuit 109 reaches 0 (in which the divisional number is not determined) and then to output the value HSize to the determining circuit 109. The halving function 106 is caused to store a halved one of the value of the H register 103 in the H2 register 104 when N=1 and Hsel=0, while the halving function 107 is caused to store a halved one of the valve of H2 register 104 in the H4 register 105 when N=2 and Hsel=0.

The selector 108 operates to output the corresponding HSize value with the value of the counter N to the determining circuit 109. The selector 108 operates to supply the value stored in the full-line H register 103 in the case of N=0, the value stored in the H2 register 104 in the case of N=1, or the value stored in the H4 register 105 in the case of N=2.

The determining circuit 109 compares the HSize to be inputted with the line size 1024+α of the line buffer and determines the concerned divisional number if HSize is smaller than the line size. That is, if the relation of HSize<=1024+α is established, Hsel=1 (in which the divisional number is determined) is outputted, while if the relation is not established, Hsel=0 (in which the divisional number is not determined) is outputted.

When the output Hsel of the determining circuit 109 becomes one (1) and thereby the divisional number is determined, the address counter 110 calculates the storage address of the transfer data through the use of the horizontal pixels HSize and the values of the address register 101 and the V register 102.

In turn, the description will be oriented to the operation of the vertical 2N divider.

At first, when N becomes zero (0), the number (H) of horizontal pixels of the input image stored in the H register 103 is inputted into the determining circuit 109. The determining circuit 109 compares HSize=H with 1024+α and outputs Hsel=1 for determining the divisional number 0 if H is smaller than 1024+α.

At this time, if Hsel=1 is not established, the counter N is counted up by 1, that is, N=1 is given. The relation of N=1 causes the halving function 106 to calculate H2 and then store the calculated H2 in the H2 register 104 and put the H2 in the determining circuit 109. The determining circuit 109 compares HSize=H2 with 1024+α and outputs Hsel=1 for determining the divisional number 1 if H2 is smaller than 1024+α.

At this time, if Hsel=1 is not established, the counter N is counted up by 1, that is, N=2 is given. The relation of N=2 causes the halving function 107 to calculate H4 and then store the calculated H4 in the H4 register 105 and put the H4 in the determining circuit 109. The determining circuit 109 compares HSize=H4 with 1024+α and outputs Hsel=1 for determining the divisional number 2 if H4 is smaller than 1024+α.

When Hsel=1 is given, the address counter 110 performs the data transfer control through the use of the HSize (H, H2 or H4) according to the determined divisional number and the values of the address register 101 and the V register 102. Hereafter, each division case will be described.

Figure 6:
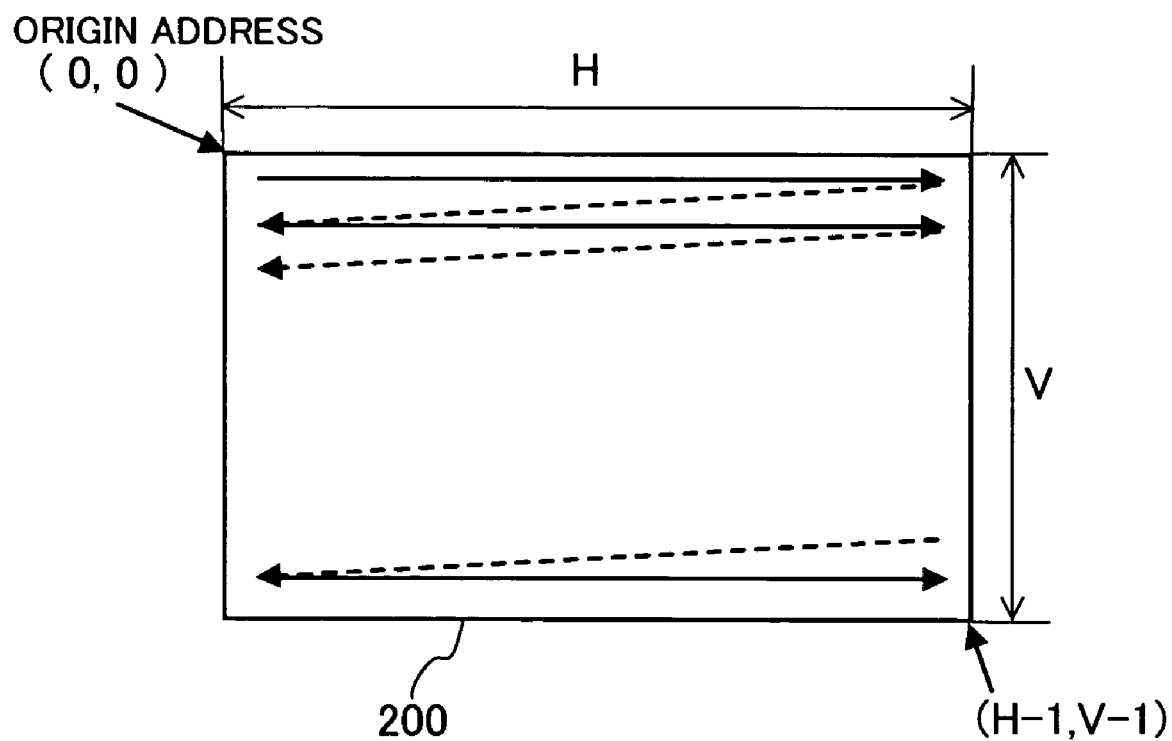
FIG. 6 illustrates an operation of an address counter in the case of no division in the embodiment of the present invention.

At first, the description will be oriented to the operation of the address counter in the case of no division (the divisional number=0) with reference to FIG. 6. In this embodiment, if the H of the input image 200 is smaller than 1024+α, the images of the sizes such as VGA and SVGA are processed without any division. Since it is considered that the maximum size of the moving image is the VGA size, the moving image is also processed without any division.

For no division, the address control is executed so that the data may be transferred line by line with the value of the address register 101 as a reading start point and H as a line size. This allows all the pixels located horizontally at the origin address (0, 0) of the input image 200 to at the H-th address to be read as one line and then transferred into the line buffer. In succession, when pointing to the read start point address (0, 1) of the next line, the data of one line located at this address to the H-th address is transferred. The foregoing operation is repeated until the data reaches the final pixel (H-1, V-1).

Figure 7A:
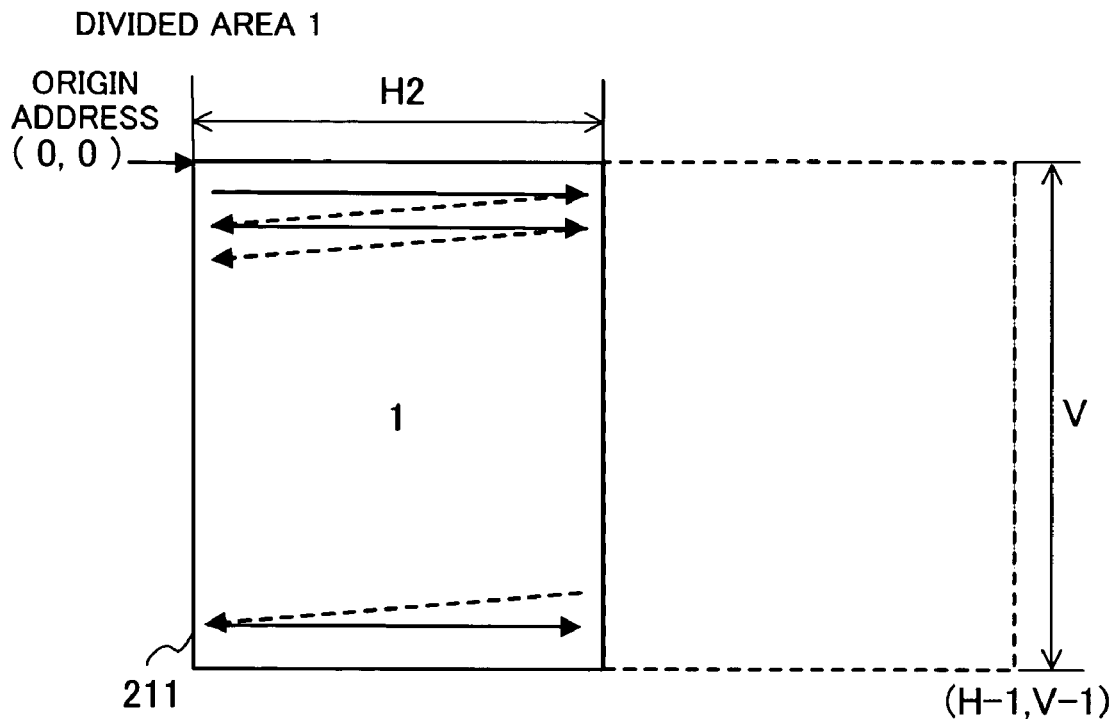
FIGS. 7A and 7B illustrate the operation of an address counter in the two-divisional process in the embodiment of the present invention.
Figure 7B:
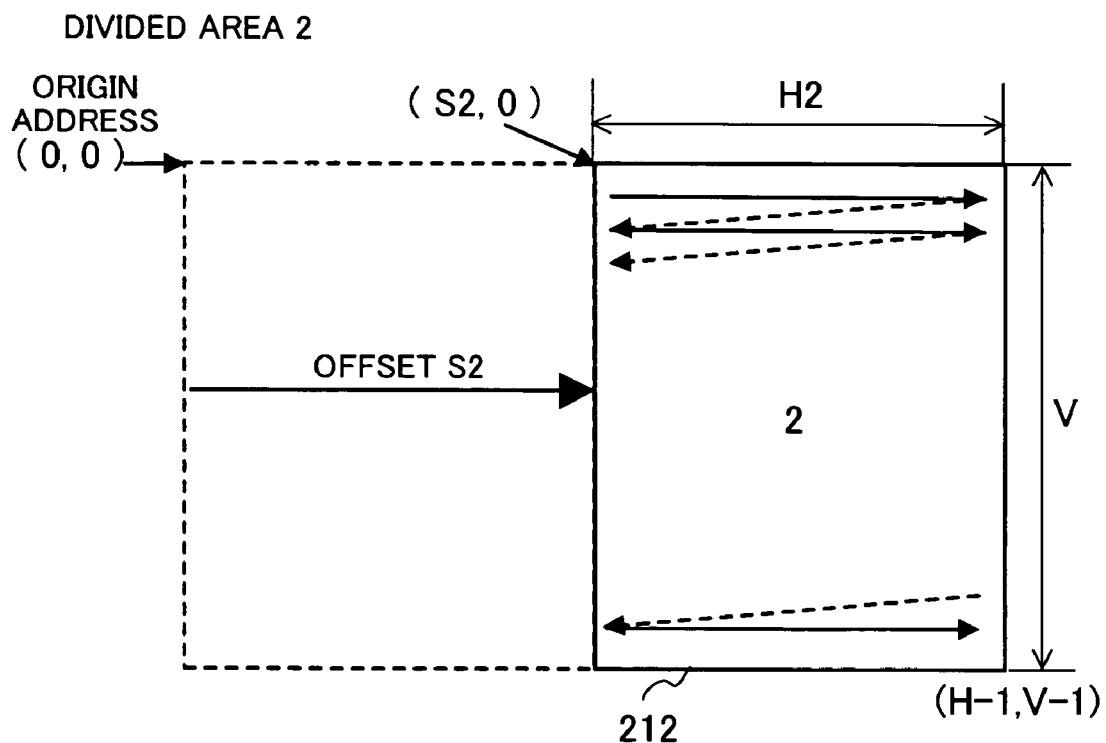

In turn, the description will be oriented to the operation of the address counter in the case of two division or halving (the divisional number=1) with reference to FIGS. 7A and 7B. FIG. 7A illustrates the operation of the address counter of the divided area 1 in the halving process of the embodiment. FIG. 7B illustrates the operation of the address counter of the divided area 2. In this embodiment, if the H of the input image ranges from 1024+α to 2048, for example, the image of the size such as SXGA (1280×1024 pixels) is processed by the halving process.

The data transfer in the halving case is executed in the sequence from a divided area 1 (211) to a divided area 2 (212), both of which are the results of halving the input image. As shown in FIG. 7A, for the divided area 1 (211), the address control is executed so that the data may be transferred line by line with the origin address (0, 0) as a read start point and H2 as the line size. As described above, the H2 is specified by a value derived by halving the input image plus m (that is a parameter depending on the size of the image processing filter) and the offset S2 is calculated with H2 according to the parameter m. This causes the pixels horizontally located at the origin address (0, 0) to the H2-th address to be read as one line and then to be transferred to the line buffer. Upon completion of one line on an H2 basis, the read start point of the next line is pointed in sequence until the data at the final pixel (H2-1, V-1) of the divided area 1 (211) is transferred. Then, as shown in FIG. 7B, for the divided area 2 (212), the read start address (S2, 0) is specified with the offset S2 and the data is transferred line by line on an H2 basis with the newly specified address as a start point. Like the divided area 1, the data is transferred vertically line by line until the final pixel (H-1, V-1) is transferred.

Figure 8A:
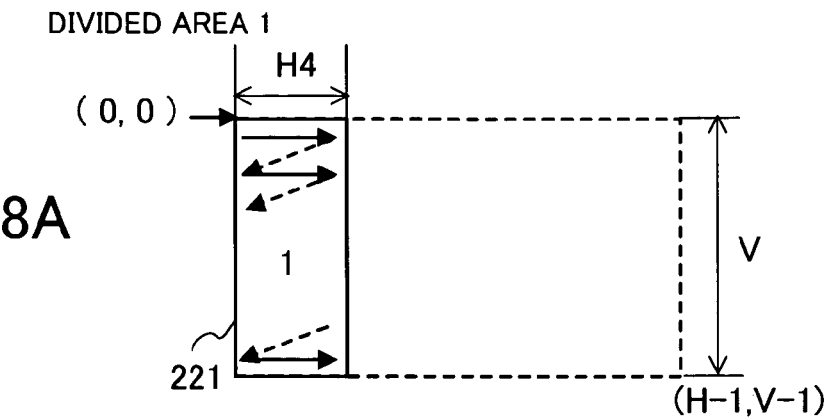
Figure 8B:
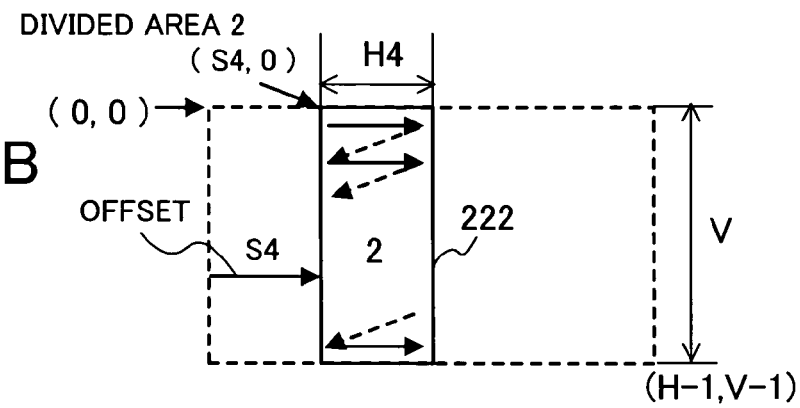
Figure 8C:
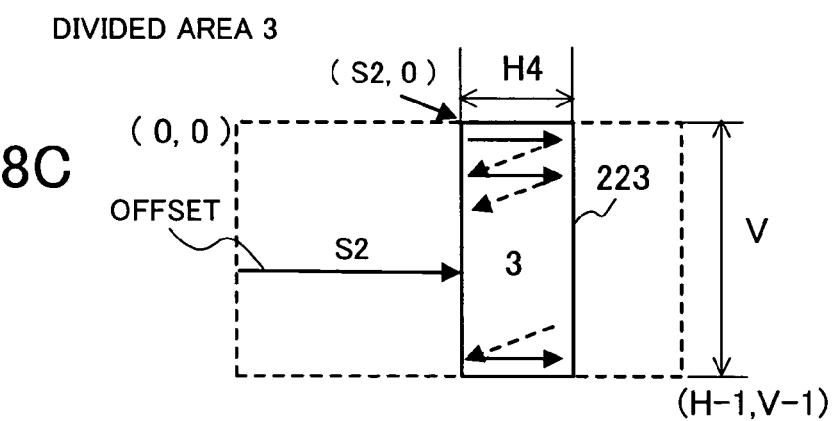
Figure 8D:
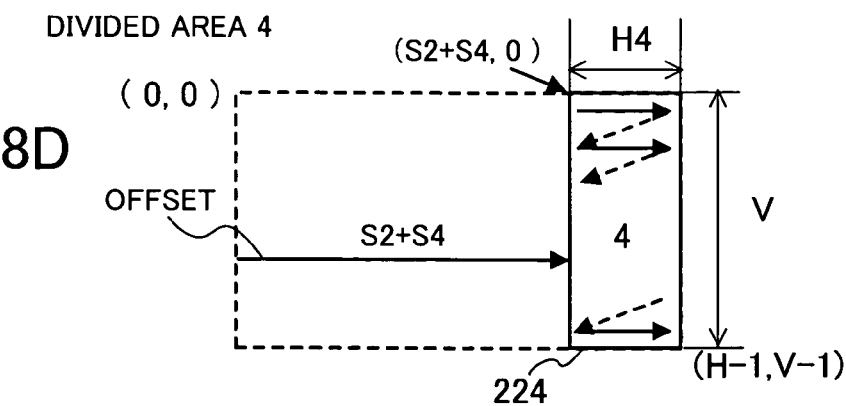

In turn, the description will be oriented to the operation of the address counter in the case of the four division or quartering process (the divisional number=2) with reference to FIGS. 8A to 8D. FIG. 8A illustrates the operation of the address counter in the divided area 1 in the case of the quartering process of the embodiment. Likewise, FIG. 8B illustrates the operation thereof in the divided area 2. FIG. 8C illustrates the operation thereof in the divided area 3. FIG. 8D illustrates the operation thereof in the divided area 4. In this embodiment, in the case that the H of the input image ranges from 2048 to 4096, the image is processed by the quartering process.

In the quartering process, the data is transferred in the sequence from the divided area 1 (221), the divided area 2 (222), the divided area 3 (223) and the divided area 4 (224), all of which are the result of the quartered input image. As shown in FIG. 8A, for the divided area 1 (221), the address control is executed so that the data may be transferred line by line with the origin address (0, 0) as a read start point and H4 as the line size. Like the H2, the H4 is specified to have "m" and the offset S4 is calculated with the H4 according to the "m". This causes the pixels horizontally located at the origin address (0, 0) to the H4-th address to be read as one line and then transferred to the line buffer. Then, the data is sequentially transferred line by line on an H4 basis in the vertical direction until all data of the divided area 1 (221) are transferred. In succession, as shown in FIG. 8B, for the divided area 2 (222), the address control is executed so that the data may be transferred line by line on an H4 basis with the read start address (S4, 0) specified by the offset S4 as a start point. Like the divided area 1 (221), the data is sequentially transferred line by line on an H4 basis in the vertical direction until all data of the divided area 2 (222) is transferred. In succession, as shown in FIG. 8C, for the divided area 3 (223), the address control is executed so that the data may be transferred line by line on an H4 basis with the start point address (S2, 0) specified by the offset S2 as a start point. Like the divided area 1 (221), the data is sequentially transferred line by line on an H4 basis in the vertical direction until all data of the divided area 3 (223) are transferred. In succession, as shown in FIG. 8D, for the divided area 4 (224), the address control is executed so that the data may be transferred line by line on an H4 basis with the start point address (S2+S4, 0) specified by the offset S2+S4 as a start point. Like the divided area 1 (221), the data is sequentially transferred line by line at an H4 unit in the vertical direction until the final pixel (H-1, V-1) is transferred.

As set forth above, in the vertical 2N division in which the input image is divided into the areas each having the same number of horizontal pixels, the address increment method to be executed when the pixel data of the input image is read from the frame buffer allows the operation of the counter to be common to any dividing process excepting the offset value on the horizontal coordinates. That is, the parameter for pointing to the address is updated by only the offset value, which makes it possible to execute the fast processing. Further, the increase of the divided areas according to the size of the input image also makes it possible to process an image of any size through the limited resource (line buffer).

In turn, the description will be oriented to the image coupling of the output pixel data vertically 2N-divided and processed in the foregoing process. The pixel processor outputs the pixel data in the foregoing data transfer sequence.

For no division, the pixel data is transferred line by line on an H basis with an origin address (0, 0) of the output image area of the frame buffer as a write start point.

For two or more divisions, the process is divided depending on the number of horizontal pixels before being divided (H in the case of coupling the divided areas on an H2 basis or H2 in the case of coupling the divided areas on an H4 basis), that is, if the pixel number is even or odd. For the even pixel number, the divided areas are straightforward coupled. For the odd pixel number, the divided areas are coupled so that the one-column junctures are overlapped with each other.

Figure 9:
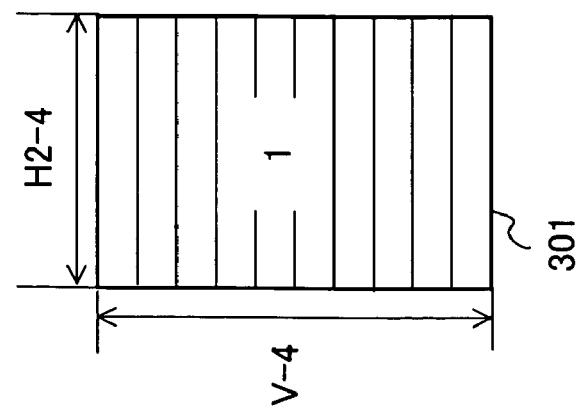
FIG. 9 illustrates an operation of coupling images in the case of dividing an input image with an even number of horizontal pixels H into two for processing the image.
Figure 9:
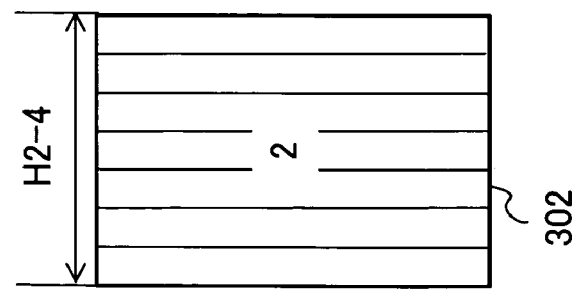
Figure 9:
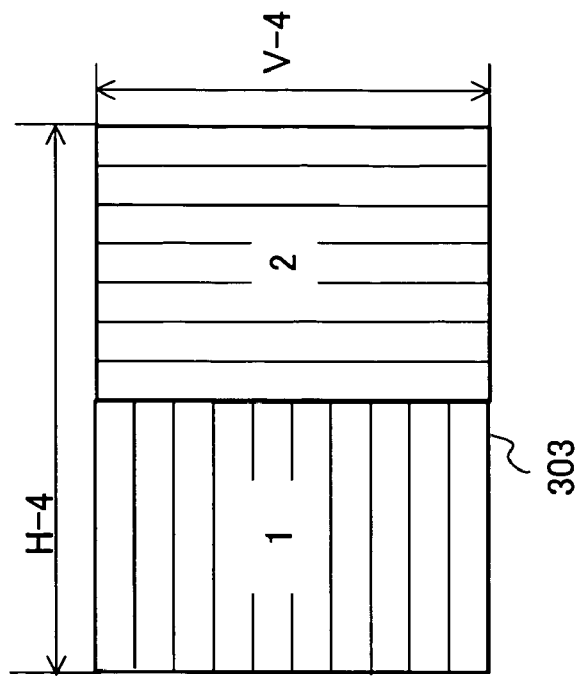

At first, the description will be oriented to the coupling of the images in the case of dividing the input image with the even number H of horizontal pixels into two with reference to FIG. 9. For coupling the areas formed by halving the even number of horizontal pixels H, those areas are simply coupled. That is, the output pixel data of the divided area 1 (301) having the area V-4 in the vertical direction is coupled with the output pixel data of the divided area 2 (302) having the area H2-4 in the horizontal direction and the area V-4 in the vertical direction. The coupled data is made to be the pixel data of the output image 303 having the area H-4 in the horizontal direction and the area V-4 in the vertical direction. The image coupling of the divided area 2 (302) is executed by horizontally shifting the output address pointed when the data is transferred to the frame buffer by the offset H2-4.

Figure 10:
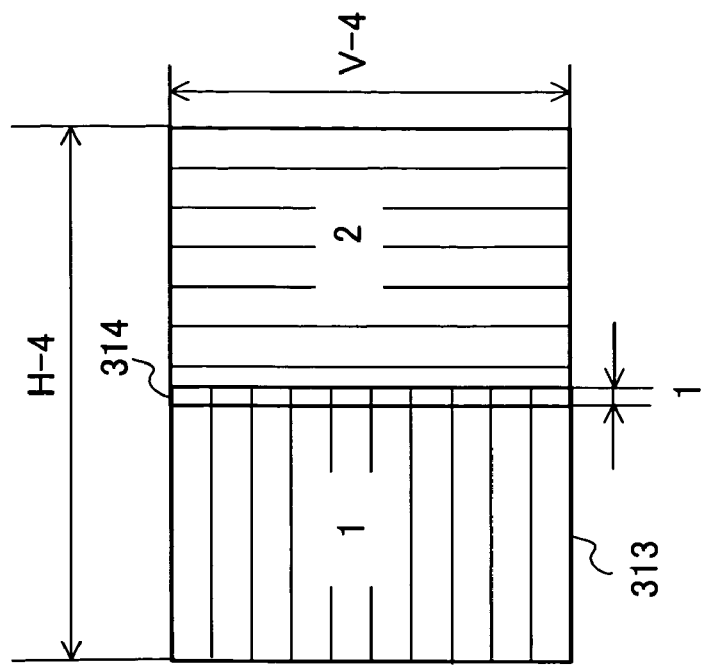
FIG. 10 illustrates an operation of coupling images in the case of dividing an input image with an odd number of horizontal pixels H for processing the image.
Figure 10:
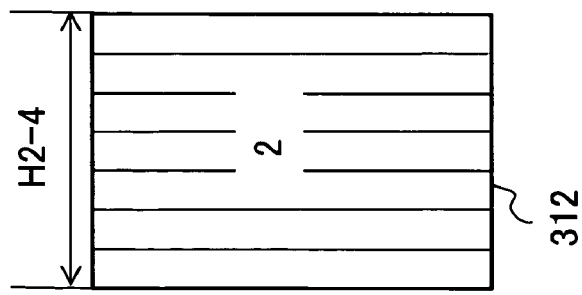
Figure 10:
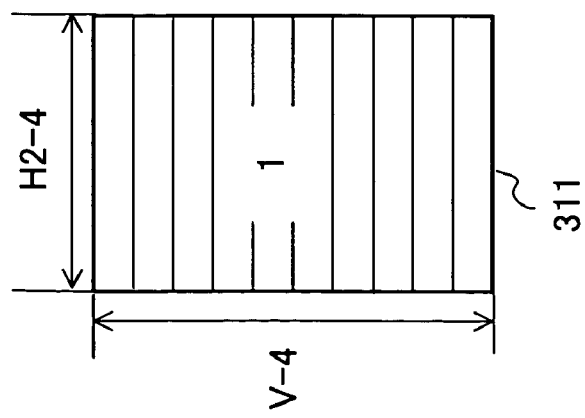

In turn, the description will be oriented to the image coupling to be executed when halving the input image with the odd number of horizontal pixels H with reference to FIG. 10. When the odd number of horizontal pixels H is halved, the juncture of one column of one divided area is overlapped with that of the other divided area. That is, after the output pixel data of the divided area 1 (311) is transferred to the frame buffer, the address is pointed so that one column of the juncture of the divided area 1 is overlapped with that of the divided area 2 with the offset value as H2-3, and then the output pixel data of the divided area 2 (312) is transferred into the frame buffer. This process results in generating the output image 313 with the juncture 314 composed of one column of the divided area 1 being overlapped with that of the divided area 2. Further, in the foregoing process, the pixel data located at one column of the juncture 314 is specified to have the pixel data of the divided area 2 (312). With respect to one column of the juncture 314, the same pixel value is calculated for the divided areas 1 (311) and 2 (312). Hence, the juncture of any divided area may be selected.

Figure 11:
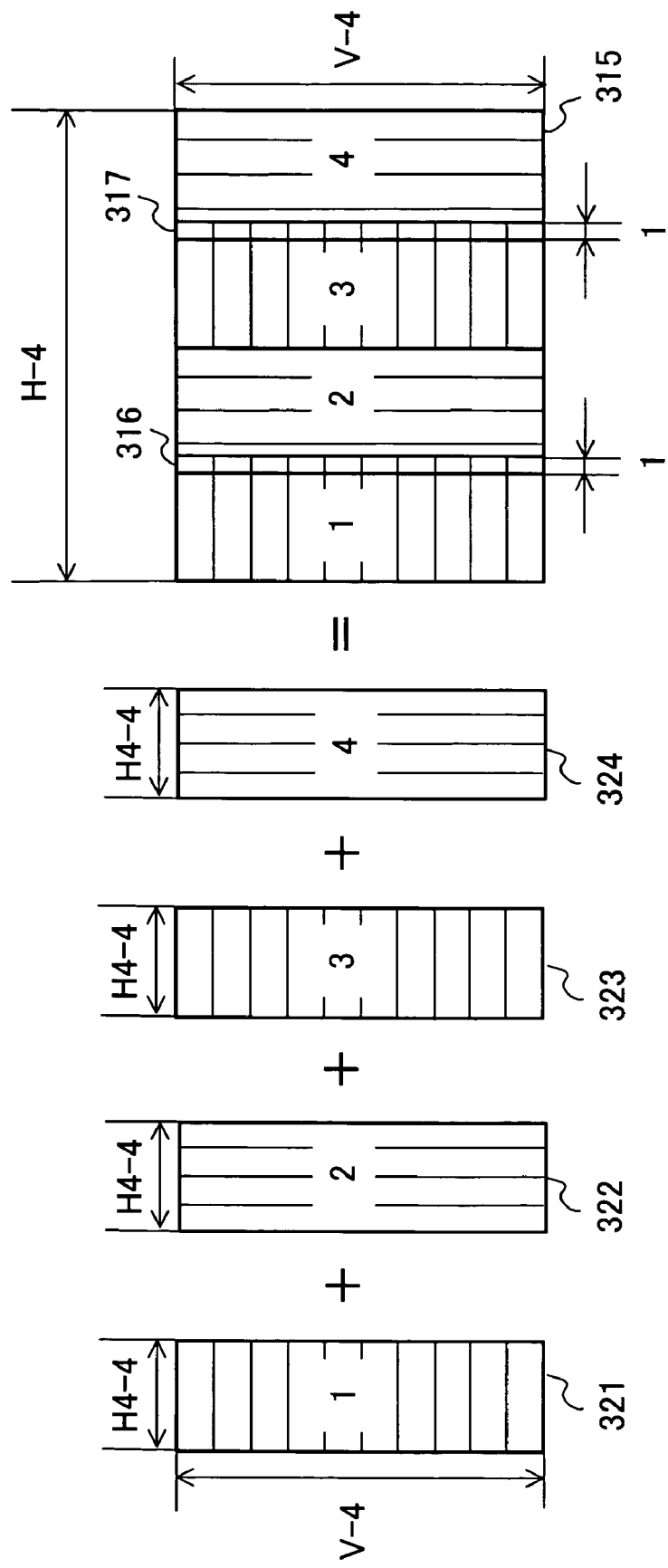
FIG. 11 illustrates an operation of coupling images in the case of dividing an input image with an even number of horizontal pixels H into two and further dividing the number of horizontal pixels H2 (odd) in the divided area for processing the input image according to the embodiment of the present invention.

Then, with reference to FIG. 11, the description will be oriented to the image coupling to be executed in the process of halving the input image with the even number of horizontal pixels H and then the odd number of horizontal pixels H2 in the divided area. At first, the output pixel data of the divided area 1 (321) is transferred with the origin address (0, 0) of the output image as the write start address. Next, since the number of horizontal pixels H2 composed of the divided areas 2 (322) and 1 (321) is odd, the address is controlled with the offset value as H4-3 so that one column of the divided area 2 (322) may be overlapped with that of the divided area 1 (321) when the data is transferred. Turning to the next coupling of the divided areas 3 (323) and 2 (322), since the number of horizontal pixels H is even when the image is divided, the output address pointed when the data is transferred to the frame buffer is shifted horizontally by the offset (H4-4)×2 and the divided areas 3 (323) and 2 (322) are coupled without being overlapped. Further, since the number of horizontal pixels H2 composed of the divided areas 4 (324) and 3 (323) is odd, the divided area 4 (324) is overlapped with the divided area 3 (323) by one column when the data is transferred. This results in generating the output image 315 with the juncture 316 being overlapped with the juncture 317.

As set forth above, the data transfer process is common to any divided area except the change of an address of a write start point by using the offset value for each divided area, which makes it possible to execute the process at fast speed. Further, the coupling of the divided areas is executed merely by the offset of the data transfer destination. Hence, no storage area for temporality storing middle data for coupling is required, which leads to making good use of a memory.

In turn, the description will be oriented to the image processing method to be executed by the aforementioned image processing apparatus.

Figure 12:
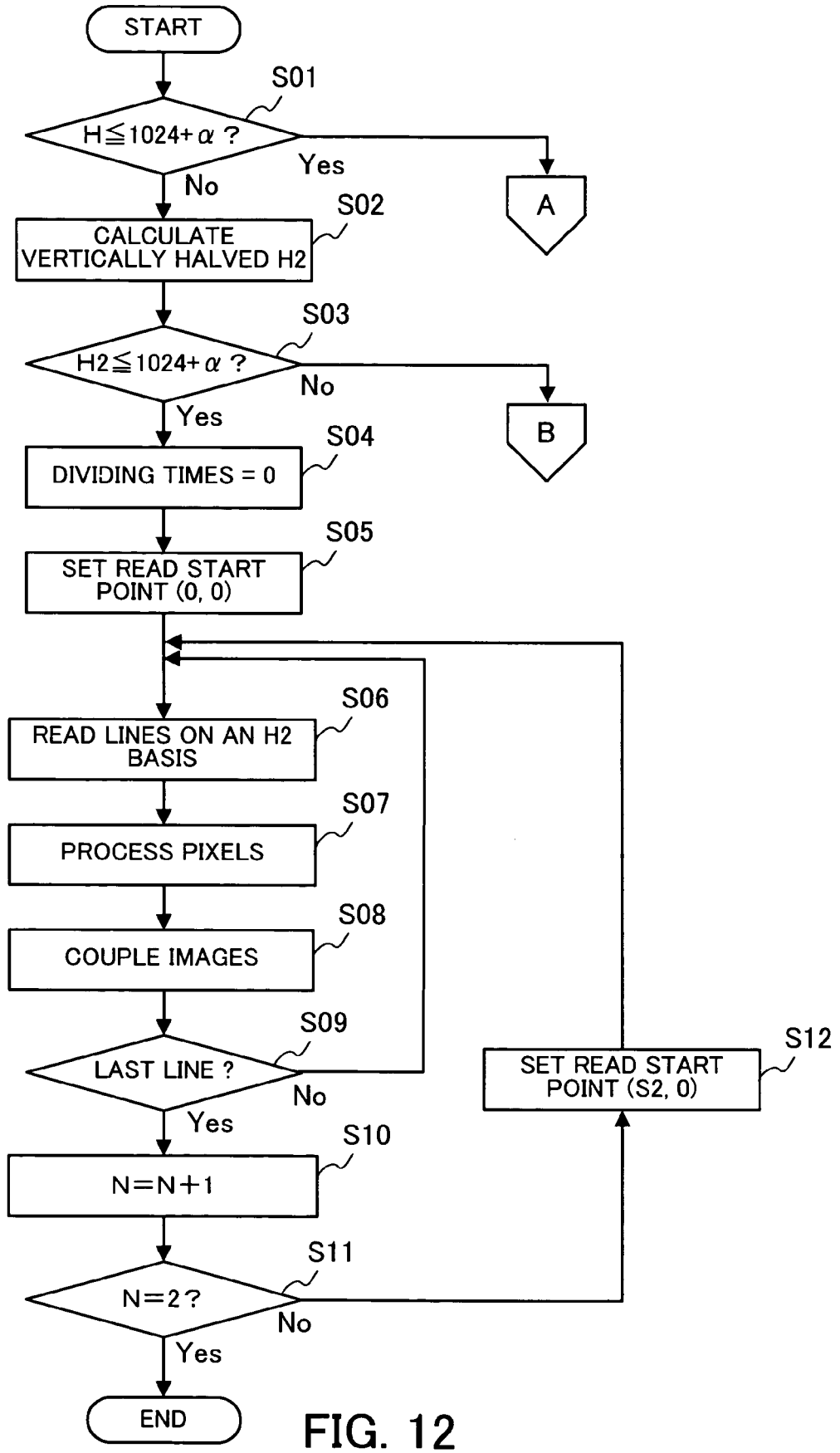
FIG. 12 is a flowchart showing a procedure of the image processing method according to the embodiment of the present invention.

FIG. 12 is a flowchart illustrating the process of the image processing method according to this embodiment.

After the input image is set to the frame buffer, the process is started.

[Step S01] The H of the input image is compared with the size 1024+α of the line buffer. If H is smaller than 1024+α, that is, the process is allowed to be executed without any division, the process goes to the process A to be discussed later. If the H exceeds 1024+α, the process goes to a step S02.

[Step S02] If the pixels of the H of the input image compose a still picture having 1024+α or more pixels, the process is executed to calculate H2 by vertically halving the input image. If the H is even, the H2 is calculated by the following expression:

$$H2 = \text{Int}(H/2) + 2 \qquad (1)$$

If the H is odd, the H2 is calculated by the following expression:

$$H2 = \text{Int}(H/2) + 1 + 2 \qquad (2)$$

wherein "Int" is a function of picking up an integer portion of an argument (rounding down the fraction part). the H2 is calculated by the expressions (1) and (2).

[Step S03] The number of horizontal pixels H2 of a halved portion is compared with the size 1024+α of the line buffer. If the H2 exceeds 1024+α, that is, the process is not allowed with halving, the process goes to the process B to be discussed later. If the H2 is smaller than 1024+α, the process goes to a step S04.

[Step S04] Since the input image is allowed to be vertically halved, the following vertical halving process is executed. At first, the initial value of the dividing times N for indicating the divided area being processed is set to zero (0). N=0 indicates the process for a divided area 1 and N=1 indicates the process for a divided area 2.

[Step S05] The upper left origin point (0, 0) of the input image is set as the read start point of the data transfer source. Further, the upper left origin point of the output image corresponding with the read start point is set as the write start point of the corresponding output pixel data.

[Step S06] The pixel data of the concerned input image is read line by line on an H2 basis and then transferred to the line buffer. That is, the pixel data composed of the H2 pixels ranged horizontally is vertically read line by line by the amount corresponding to an empty area of the line buffer and then the read pixel data is written in the line buffer.

[Step S07] The processing of using the image filter such as pixel interpolation and edge enhancement are executed with respect to the pixel data transferred to the line buffer and the pixel-based operations such as gamma correction and color space conversion are executed with respect to the processed pixel data, for generating the final pixel data to be outputted.

[Step S08] The output pixel data is written line by line in the frame buffer, and the images composed of the written pixel data are coupled with each other. That is, the output pixel data composed of H2-4 pixels ranged horizontally is written line by line in the frame buffer.

[Step S09] It is determined if the process reaches the last line. If not, the process goes back to the step S06 in which the data transfer process is repeated with respect to the remaining lines that are not still transferred.

[Step S10] If the process reaches the last line, the dividing times N are incremented.

[Step S11] It is determined if the dividing times N are 2, that is, the process reaches the divided area 2 represented as N=1. If N=2, the process is terminated. If N=1, the data transfer process is executed with respect to the divided area 2.

[Step S12] For transferring data of the divided area 2, the read start point is moved by the offset S2 and the coordinates (S2, 0) of the input image is specified as the read start point. Then, turning back to the step S06, the process is repeated from the line-by-line read on an H2 basis. The value of S2 is calculated with H by the following expression:

$$S2 = \text{Int}(H/2) = 2 \qquad (3)$$

The foregoing process results in vertically halving the input image having the number of horizontal pixels ranging from 1024+α to 2048, processing those pixels of the divided portion, and generating a final image to be outputted.

Figure 13:
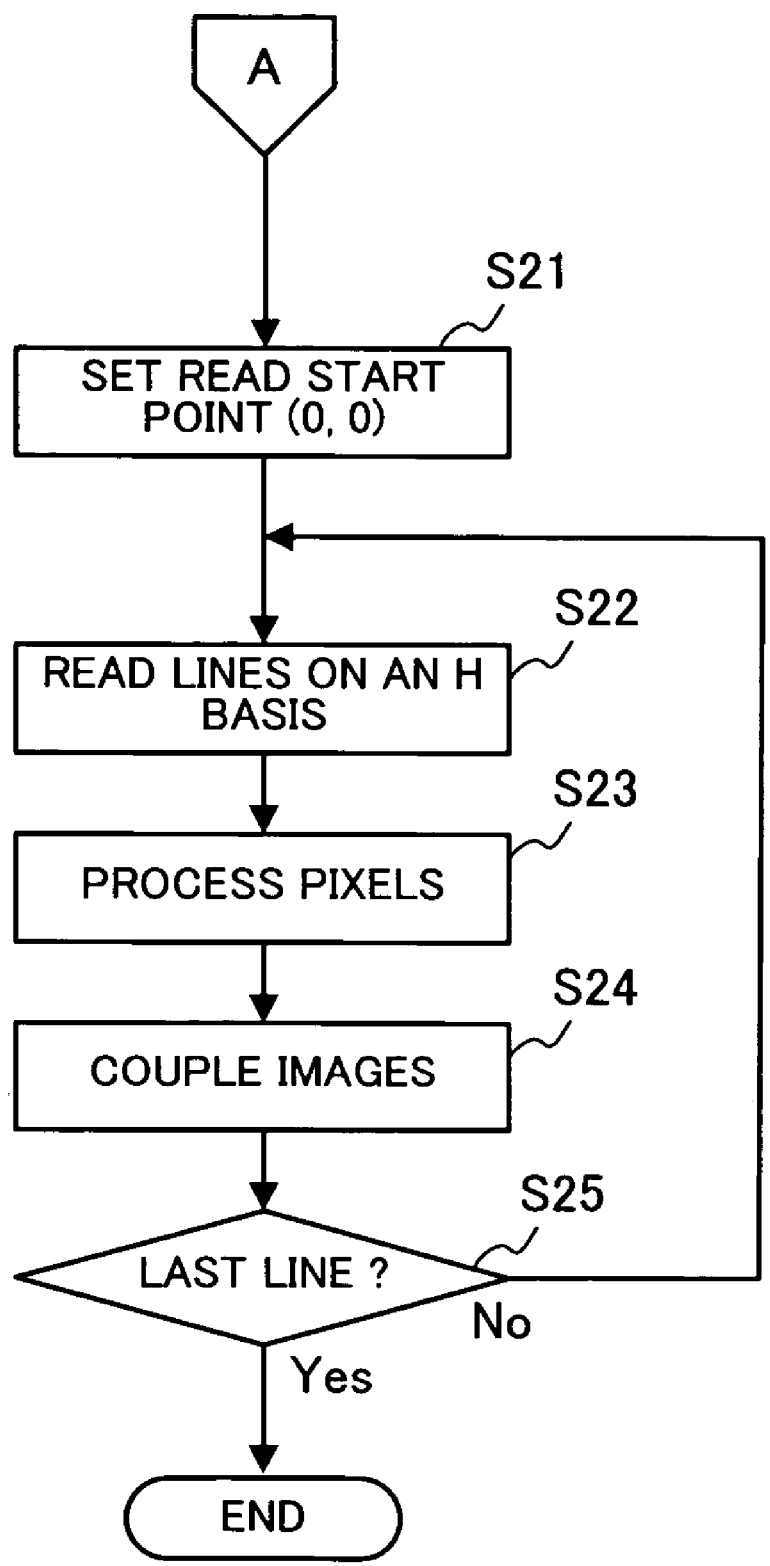
FIG. 13 is a flowchart showing a procedure executed in the case of no division in the image processing method according to the embodiment of the present invention.

In turn, the description will be oriented to the process A. The process A concerns with the process of a still image or a moving image composed of 1024+α or less pixels without any division. FIG. 13 is a flowchart illustrating the process with no division to be executed by the image processing method according to this embodiment.

[Step S21] The upper left origin point (0, 0) of the input image is set as the read start point of the data transfer source. Further, the upper left origin point of the output image corresponding with the read start point is set as the write start point of the corresponding output pixel data.

[Step S22] The process is executed to read the data line by line on an H basis and then the pixel data of the concerned input image is transferred to the line buffer. That is, the pixel data composed of H pixels ranged horizontally is read vertically by an amount corresponding to an empty area of the line buffer in a line-by-line manner. The read pixel data is written in the line buffer.

[Step S23] The processing of using the image filter such as pixel interpolation and edge enhancement are executed with respect to the pixel data transferred to the line buffer. Further, the pixel-based operations such as gamma correction and color space conversion are executed with respect to the processed pixel data, for generating the pixel data to be outputted.

[Step S24] The output pixel data is written line by line in the frame buffer, and the images composed of the written pixel data are coupled with each other. That is, the output pixel data composed of H-4 pixels ranged horizontally is written line by line in the frame buffer.

[Step S25] It is determined if the process reaches the last line. If not, the process goes back to the step S22 from which the data transfer process is repeated with respect to the remaining lines that are not still transferred.

The foregoing process results in processing the input pixel data of a still image or a moving image composed of 1024+α or less horizontal pixels without any division and generating the image to be outputted.

Figure 14:
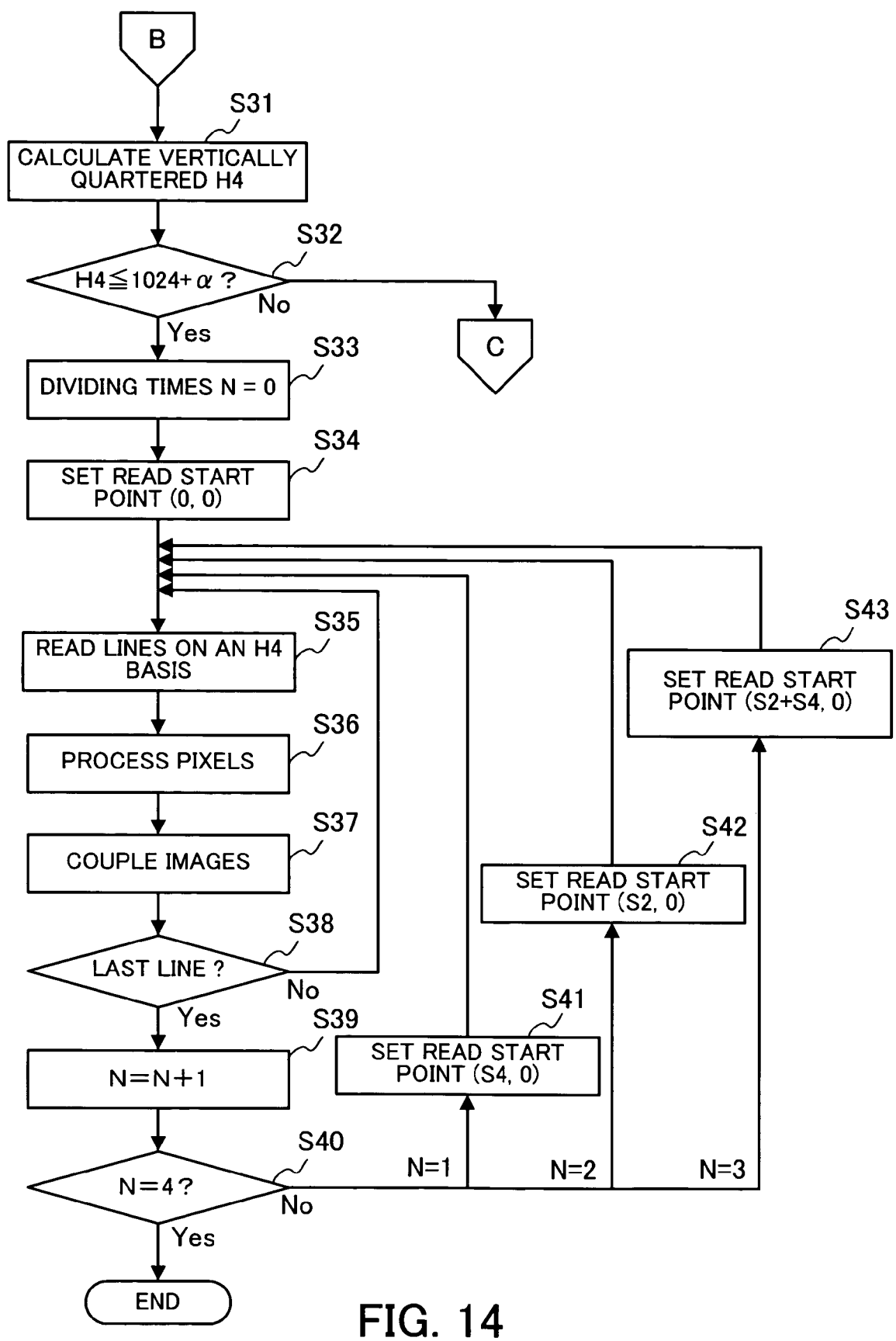
FIG. 14 is a flowchart showing a procedure executed in the case of vertical division into four in the image processing method according to the embodiment of the present invention.
Figure 15:
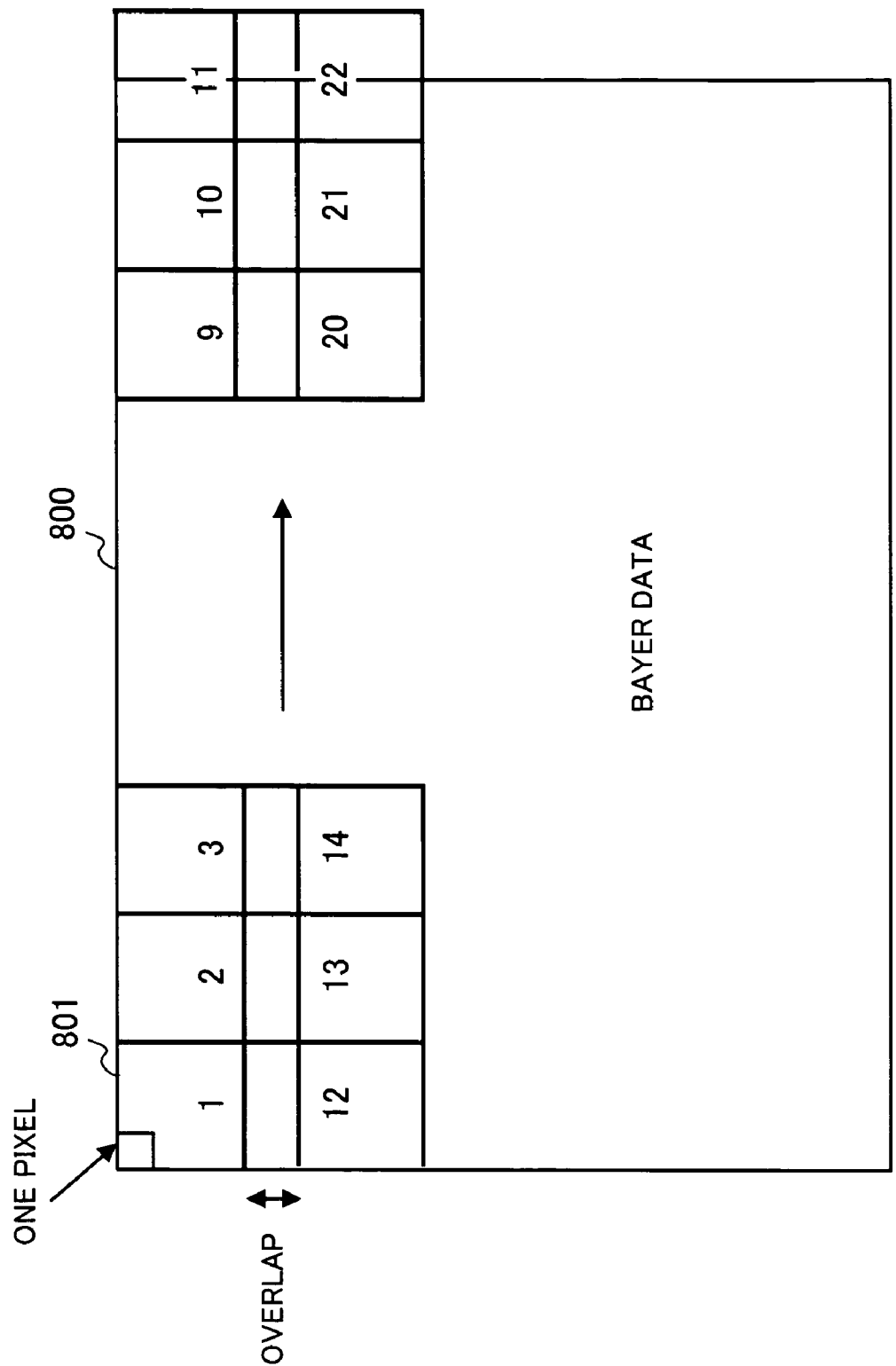
FIG. 15 illustrates a data reading sequence in the conventional block-by-block reading process.
Figure 16:
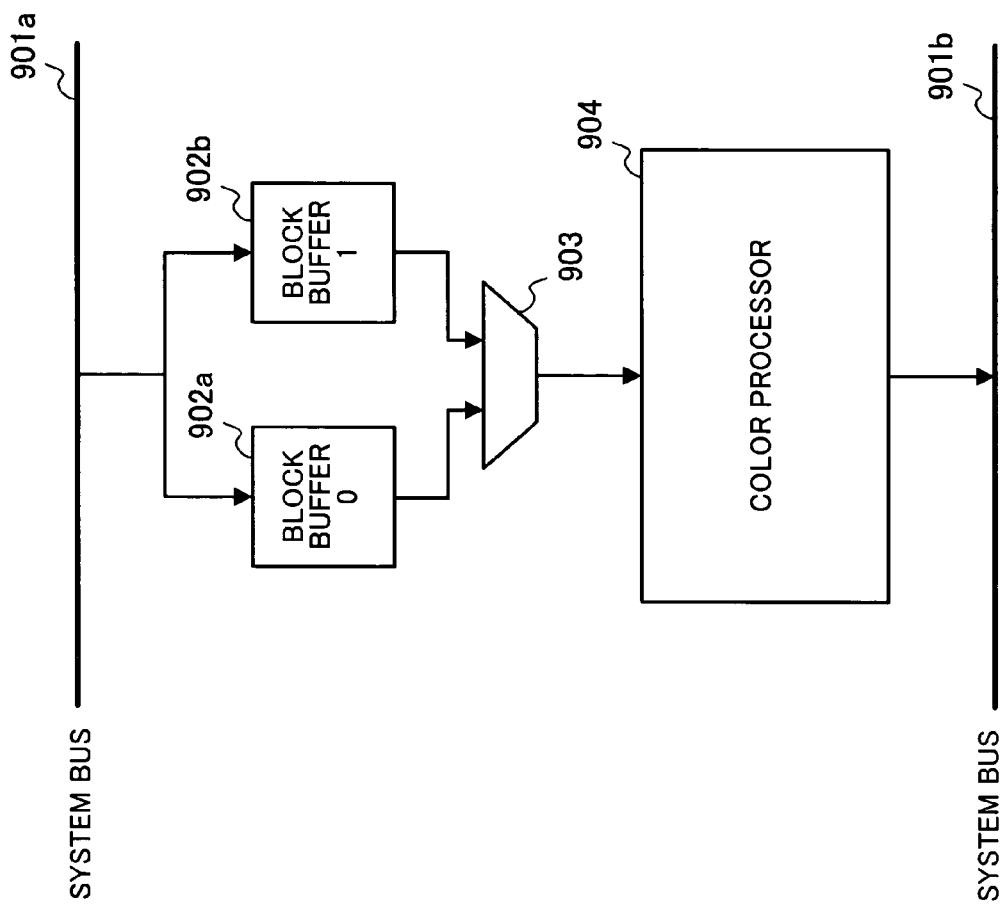
FIG. 16 is a block diagram showing the conventional block-by-block reading and processing circuit.
Figure 17:
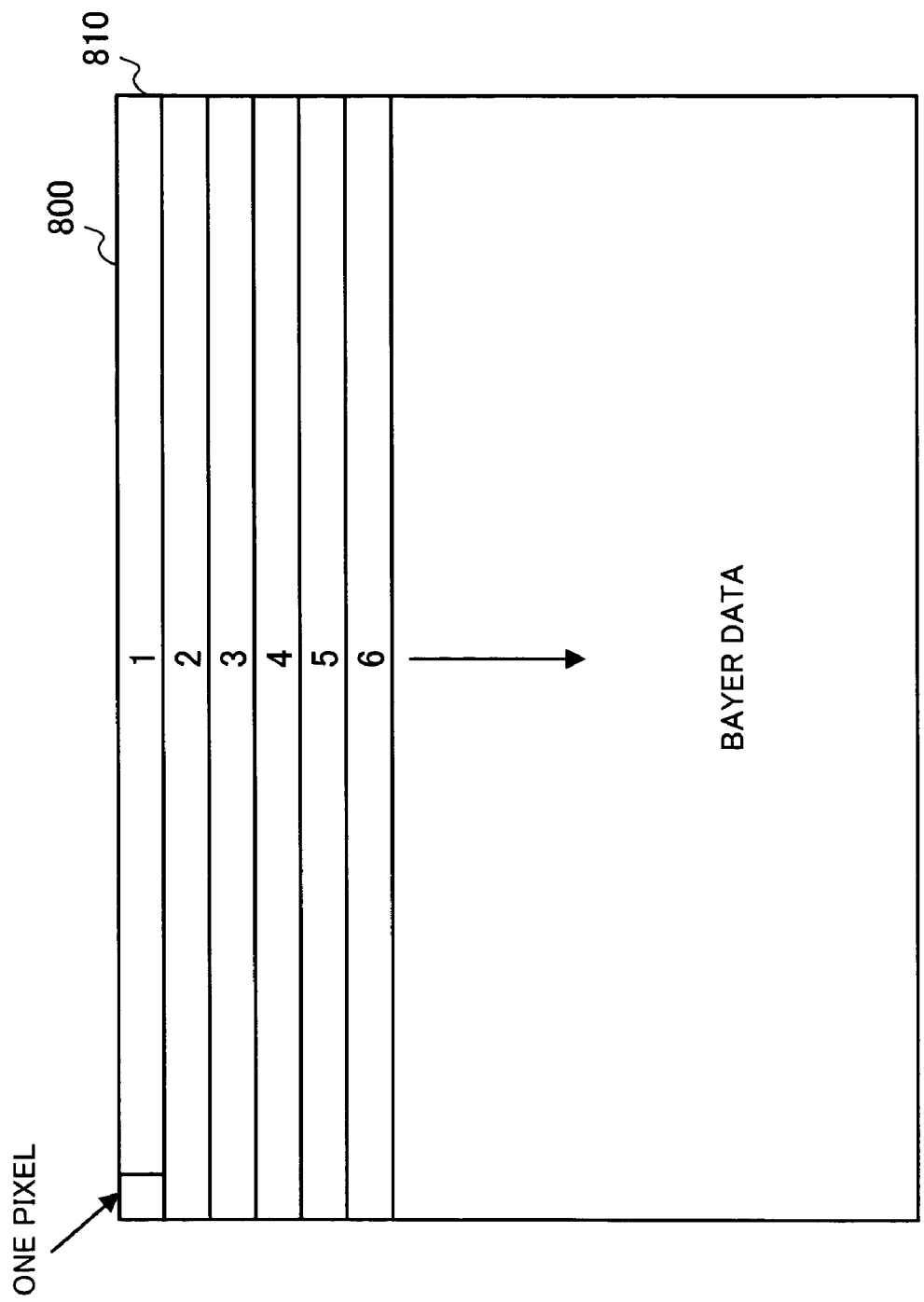
FIG. 17 illustrates a data reading sequence in the conventional line-by-line reading process.
Figure 18:
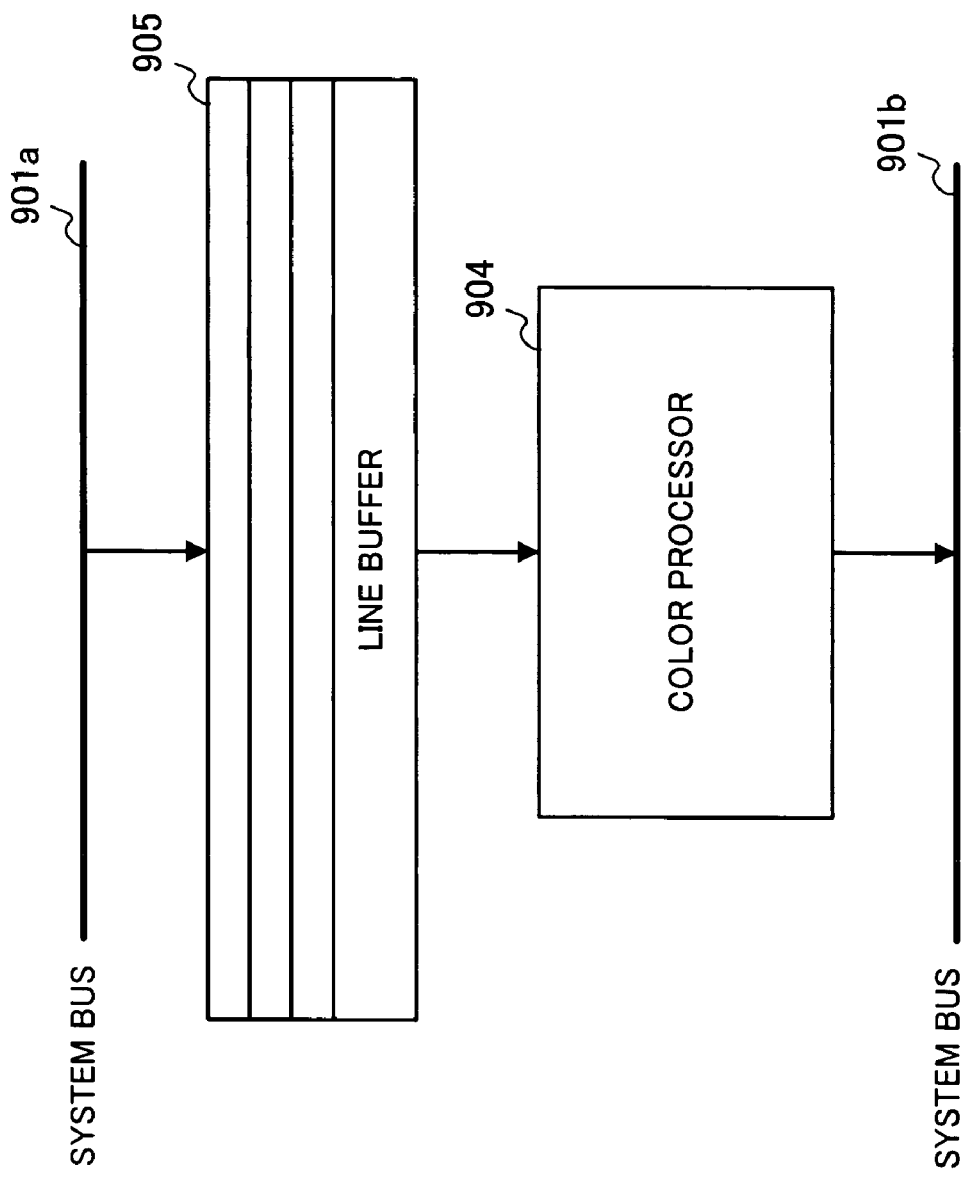
FIG. 18 is a block diagram showing the conventional line-by-line reading and processing circuit.

In turn, the description will be oriented to the process B. The process B concerns with the process of vertically quartering a still image composed of 2048 or more pixels. FIG. 14 is a flowchart illustrating the vertically quartering process to be executed by the image processing method according to this embodiment.

[Step S31] If the pixels of the halved H2 compose a still image having 1024+α or more pixels, the process is executed to calculate an H4 of the vertically quartered image. If the H2 is even, the H4 is calculated by the following expression:

$$H4 = \text{Int}(H2/2) + 2 \qquad (4)$$

On the other hand, if the H2 is odd, the H4 is calculated by the following expression:

$$H4 = \text{Int}(H2/2) + 1 + 2 \qquad (5)$$

[Step S32] The H4 of the quartered image is compared with the size 1024+α of the line buffer. If the H4 exceeds the size 1024+α, that is, the process is not allowed with the quartering, the process goes to the process C. The process C concerns with the process of halving the H4 and performing the same process as the quartering process. Hence, the description about the process C is left out. If the H4 is smaller than 1024+α, the process goes to a step S33.

[Step S33] Since the input image can be treated by the vertical quartering process, the following vertical quartering process is carried out. At first, the dividing times N are set to an initial value of 0. The times N=0 indicate the process for a divided area 1, the time N=1 indicate the process for a divided area 2, the times N=2 indicate the process for a divided area 3 and the times N=3 indicate the process for a divided area 4.

[Step S34] The upper left origin point (0, 0) of the input image is set as the read start point of the data transfer source. Further, the upper left origin point of the output image corresponding with the read start point is set as the write start point of the corresponding output pixel data.

[Step S35] The data is read line by line on an H4 basis so that the corresponding pixel data to the input image may be transferred into the line buffer. That is, the H4-pixel data ranged horizontally is read vertically by the amount corresponding to an empty area of the line buffer, and then the read pixel data is written in the line buffer.

[Step S36] The processing of using the image filter such as pixel interpolation and edge enhancement are executed with respect to the pixel data transferred to the line buffer, and then the pixel-based operations such as gamma correction and color space conversion are executed with respect to the processed pixel data, for generating the pixel data to be outputted.

[Step S37] The output pixel data is written in the frame buffer in a line-by-line manner. Then, the images composed of the written pixel data are coupled with each other. That is, the output pixel data composed of H4-4 pixels ranged horizontally is written in the frame buffer in a line-by-line manner.

[Step S38] It is determined if the process reaches the last line. If not, the process goes back to the step S35 from which the data transfer process is repeated with respect to the remaining lines that are not still transferred.

[Step S39] If the process reaches the last line, the dividing times N are incremented.

[Step S40] It is determined if the dividing times N are four, that is, the process reaches the divided area 4 represented by N=3. If N=4 is determined, the process is terminated. If N=1 is determined, the process goes to a step S41. If N=2 is determined, the process goes to a step S42. If N=3 is determined, the process goes to a step S43. For each case, the data transfer process is executed with respect to the corresponding divided area.

[Step S41] If N=1, for transferring the data of the divided area 2, the read start point is moved by the offset S4 and the coordinate (S4, 0) of the input image is set to the read start point. Then, the process goes back to the step S35 from which the process of reading data line by line on an H4 basis is executed. The value of S4 is calculated with the H2 by the following expression:

$$S4=\mathrm{Int}(H2/2)-2 \qquad (6)$$

[Step S42] If N=2, for transferring the data of the divided area 3, the read start point is moved by the offset S2 and the coordinate (S2, 0) of the input image is set to the read start point. Then, the process goes back to the step S35 from which the process of reading data line by line on an H4 basis is executed. The value of S2 is calculated by the expression (3).

[Step S43] If N=3, for transferring the data of the divided area 4, the read start point is moved by the offset S2+S4, and the coordinates (S2+S4, 0) of the input image are set to the read start point. Then, the process goes back to the step S35 from which the process of reading data line by line on an H4 basis is executed. The value of S2 is calculated by the expression (3) the value of S4 is calculated by the expression (6).

The aforementioned process results in vertically quartering the input image having 2048 to 4096 horizontal pixels, processing the quartered pixels, and generating a final image to be outputted.

Further, by 2N-dividing the image area, the input image of any size may be processed by the foregoing process.

Further, the foregoing image processing apparatus may be offered as a semiconductor device in which the circuits of the image-processing functions including the vertically 2N dividing function at minimum are built as semiconductor circuits. The image processing apparatus loaded as the semiconductor device on a chip may be applied to a mobile phone or a digital camera. Hence, this image processing apparatus makes great contributions to enhancing the image-processing functions without having to increase the circuit scale.

According to the present invention, the image processing apparatus and method are arranged to vertically and equally divide the input image according to the number of horizontal pixels on the width, stored in the line buffer that enables to temporarily store the pixel data composed of plural lines each of which is composed of a predetermined number of horizontal pixels, sequentially transfer the pixels of each divided area to the line buffer, process those pixels, and then coupling the processed pixel data of all divided areas into an output image. As described above, by vertically dividing the input image, processing the divided rectangular images, and coupling those images into one image, these image processing apparatus and method have a capability of processing an image of any size through the line buffer with the limited number of horizontal pixels on the width at fast speed and in a line-by-line manner. This makes it possible to enhance the image-processing functions without having to increase the circuit scale.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus for reading an input image on a predetermined unit basis, processing the image, and generating an output image, comprising:

a temporary storage unit having a storage area located horizontally and provided with a predetermined number of horizontal pixels and for temporarily storing a plurality of lines of pixel data of the input image corresponding to the predetermined number of horizontal pixels;

an image dividing unit for vertically and equally dividing the input image according to the predetermined number of horizontal pixels if the number of horizontal pixels of the input image is larger than the predetermined number of horizontal pixels;

an input data transfer unit for sequentially transferring to the temporary storage unit the divided pixel data of the input image;

a pixel processing unit for performing image processing on a single or plural pixels basis with respect to the divided pixel data of the input image transferred to the temporary storage unit;

an image coupling unit for controlling transfer of the pixel data of the pixel processing unit so that the pixel data is coupled with each other, for generating an output image;

an output data transfer unit for transferring output pixel data from the pixel processing unit to an output image storage area, wherein the image dividing unit divides pixel data of the input image to be divided so that each of the divided pixel data includes overlapped pixel data located on the pixel data of the input image to be divided if the number of horizontal pixels of the pixel data of the input image to be divided is odd, and wherein the image dividing unit divides pixel data of the input image to be divided so that each of the pixel data of the input image to be divided does not include overlapped pixel data if the number of horizontal pixels of the pixel data of the input image to be divided is even.

2. The image processing apparatus according to claim 1, wherein the image dividing unit divides the input image into even number of areas, each of which has the number of horizontal pixels that does not exceed the predetermined number of horizontal pixels.

3. The image processing apparatus according to claim 1, wherein the input data transfer unit provides the number of horizontal pixels of each of equally divided areas as a unit and transfers the pixel data of the input image belonging to the divided area on that unit basis in a line-by-line manner.

4. The image processing apparatus according to claim 1, wherein the image dividing unit has as an offset value the number of horizontal pixels of each of equally divided areas, calculates a pointer for pointing to a location at which the pixel data of the input image corresponding to the divided area is stored with the offset value, and indicates to the input data transfer unit the calculated pointer as a read start point.

5. The image processing apparatus according to claim 1, wherein the image coupling unit has an offset value the number of horizontal pixels of each of equally divided areas, calculates a pointer for pointing to a location at which the output pixel data of the output image corresponding to each of the divided areas is stored with the offset value and indicates to the output data transfer unit the calculated pointer as a write start point.

6. The image processing apparatus according to claim 1, wherein the image coupling unit couples the pixel data column located on the horizontal center between the divided areas if both of the divided areas to be coupled include the pixel data column located on the horizontal center common to each other.

7. The image processing apparatus according to claim 1, wherein at least one of the input data transfer unit and the output data transfer unit is a DMA controller.

8. The image processing apparatus according to claim 7, wherein the input data transfer unit and the output data transfer unit are composed of a common DMA controller so that the input data transfer or the output data transfer is executed by the image dividing unit and the image coupling unit.

9. The image processing apparatus according to claim 1, wherein the predetermined number of horizontal pixels on the width included in the temporary storage unit is larger than the number of horizontal pixels on the width of a VGA size.

10. The image processing apparatus according to claim 1, wherein the image dividing unit repeats vertically and equally dividing the input image previously divided by the image dividing unit until the number of horizontal pixels of the input image previously divided is equal to or smaller than the predetermined number of horizontal pixels of the temporary storage unit.

11. An image processing method for reading an input image on a predetermined unit basis, performing image processing, and generating an output image, the image processing method wherein if a number of horizontal pixels of the input image is larger than a predetermined number of horizontal pixels of a temporary storage unit provided with a storage area located horizontally and having a predetermined number of horizontal pixels and for temporarily storing a plurality of lines of pixel data of the input image corresponding to the predetermined number of horizontal pixels, an image dividing unit vertically and equally divides the input image according to the predetermined number of the horizontal pixels;

the image dividing unit controls an input data transfer unit so that the divided pixel data of the input image is sequentially transferred to the temporary storage unit;

a pixel processing unit performs image processing on a single or plural pixels basis with respect to the divided pixel data of the input image transferred to the temporary storage unit; and an image coupling unit controls an output data transfer unit so that output pixel data corresponding to one divided area from the image processing unit is coupled with output pixel data corresponding to the other divided area, and wherein at each of the divided areas, the pixel data of the input image is transferred line by line with the number of horizontal pixels of the divided area and processed, and the output pixel data of the one divided area is coupled with the output pixel data of the other divided area, for generating the output image, wherein the image dividing unit divides pixel data of the input image to be divided so that each of the divided pixel data includes overlapped pixel data located on the pixel data of the input image to be divided if the number of horizontal pixels of the pixel data of the input image to be divided is odd, and wherein the image dividing unit divides pixel data of the input image to be divided so that each of the pixel data of the input image to be divided does not include overlapped pixel data if the number of horizontal pixels of the pixel data of the input image to be divided is even.

12. The image processing method according to claim 11, wherein the image dividing unit repeats vertically and equally dividing the input image previously divided by the image dividing unit until the number of horizontal pixels of the input image previously divided is equal to or smaller than the predetermined number of horizontal pixels of the temporary storage unit.

13. A semiconductor device for reading an input image on a predetermined unit basis, performing image processing with respect to the input image, and generating an output image, comprising:

a buffer provided with a storage area located horizontally and having a predetermined number of horizontal pixels and for temporarily storing a plurality of lines of pixel data of the input image corresponding to the predetermined number of horizontal pixels;

an image divider for vertically and equally dividing the input image according to the predetermined number of horizontal pixels if the number of horizontal pixels of the input image is larger than the predetermined number of horizontal pixels of the buffer;

an input data transfer circuit for sequentially transferring to the buffer the divided pixel data of the input image;

a pixel processor for performing image processing at a single or plural pixels basis with respect to the divided pixel data of the input image transferred to the buffer;

an image coupler for controlling transfer of output pixel data of the pixel processor to be sequentially outputted so that the output pixel data are coupled with each other, for generating an output image; and an output data transfer circuit for transferring the output pixel data to an indicated output image storage area according to the image coupler, wherein the image divider divides pixel data of the input image to be divided so that each of the divided pixel data includes overlapped pixel data located on the pixel data of the input image to be divided if the number of horizontal pixels of the pixel data of the input image to be divided is odd, and wherein the image divider divides pixel data of the input image to be divided so that each of the pixel data of the input image to be divided does not include overlapped pixel data if the number of horizontal pixels of the pixel data of the input image to be divided is even.

14. The semiconductor device according to claim 13, wherein the image divider repeats vertically and equally dividing the input image previously divided by the image dividing unit until the number of horizontal pixels of the input image previously divided is equal to or smaller than the predetermined number of horizontal pixels of the buffer.

* * * * *